(12) United States Patent
Adams et al.

(10) Patent No.: US 11,134,111 B2
(45) Date of Patent: Sep. 28, 2021

(54) METHOD AND SYSTEM FOR MANAGING A MEETING SESSION

(71) Applicant: BlackBerry Limited, Waterloo (CA)

(72) Inventors: Neil Patrick Adams, Waterloo (CA); Ge Zhong, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 53 days.

(21) Appl. No.: 15/411,162

(22) Filed: Jan. 20, 2017

(65) Prior Publication Data

US 2018/0213013 A1 Jul. 26, 2018

(51) Int. Cl.
*H04L 29/06* (2006.01)
*H04W 4/08* (2009.01)
*H04L 12/18* (2006.01)

(52) U.S. Cl.
CPC ...... *H04L 65/4038* (2013.01); *H04L 12/1818* (2013.01); *H04L 12/1822* (2013.01); *H04L 65/1083* (2013.01); *H04L 65/403* (2013.01); *H04W 4/08* (2013.01)

(58) Field of Classification Search
CPC .................................................. H04L 12/1818
See application file for complete search history.

(56) References Cited

U.S. PATENT DOCUMENTS

| | | | |
|---|---|---|---|
| 10,097,598 B2 * | 10/2018 | Kay | H04L 65/403 |
| 2012/0144320 A1 | 6/2012 | Mishra et al. | |
| 2012/0226997 A1 | 9/2012 | Pang | |
| 2012/0329435 A1 | 12/2012 | Martin et al. | |
| 2013/0227096 A1 | 8/2013 | Eriksson et al. | |
| 2014/0068463 A1 * | 3/2014 | Kay | H04L 65/403 |
| | | | 715/753 |
| 2014/0143340 A1 * | 5/2014 | Eriksson | H04L 65/4038 |
| | | | 709/204 |
| 2014/0253674 A1 * | 9/2014 | Grondal | H04L 65/1083 |
| | | | 348/14.08 |
| 2014/0368605 A1 | 12/2014 | Liu | |

FOREIGN PATENT DOCUMENTS

EP  2 632 182 A1  8/2013

OTHER PUBLICATIONS

Extended European Search Report; EP 18150456.4; dated Apr. 18, 2018.
Communication Pursuant to Article 94 (3) EPC issued in European Application No. 18150456.4 dated Jul. 1, 2020, 5 pages.

* cited by examiner

*Primary Examiner* — Esther B. Henderson
(74) *Attorney, Agent, or Firm* — Fish & Richardson P.C.

(57) ABSTRACT

The present disclosure relates to a method and system for managing a meeting session. In accordance with one example, there is provided a method of managing a meeting session on a server that manages the meeting session, the meeting session comprising one or more participant devices and a presenter device. The method comprises receiving one or more break request messages from the participant devices, and sending a break message to the participant devices, the break message causing a break notification to be displayed on a display of the participant devices.

20 Claims, 11 Drawing Sheets

METHOD AND SYSTEM FOR MANAGING A MEETING SESSION

TECHNICAL FIELD

The present disclosure relates generally to the field of communications, and more particularly to methods and systems for managing a meeting session.

BACKGROUND

Mobile wireless communications devices ("mobile devices"), such as smartphones and tablets, are increasingly used to participate in meetings using applications executed on the mobile devices. Connecting mobile devices to a meeting session using a meeting application provides a variety of benefits. For example, mobile devices connected to a meeting session may share notes, annotate slides, and place conference calls. However, improvements in the functionality of meeting applications are desired, including the addition of and/or improvements in features relating to managing meeting sessions.

DETAILED DESCRIPTION OF EXAMPLE EMBODIMENTS

Figure 1:
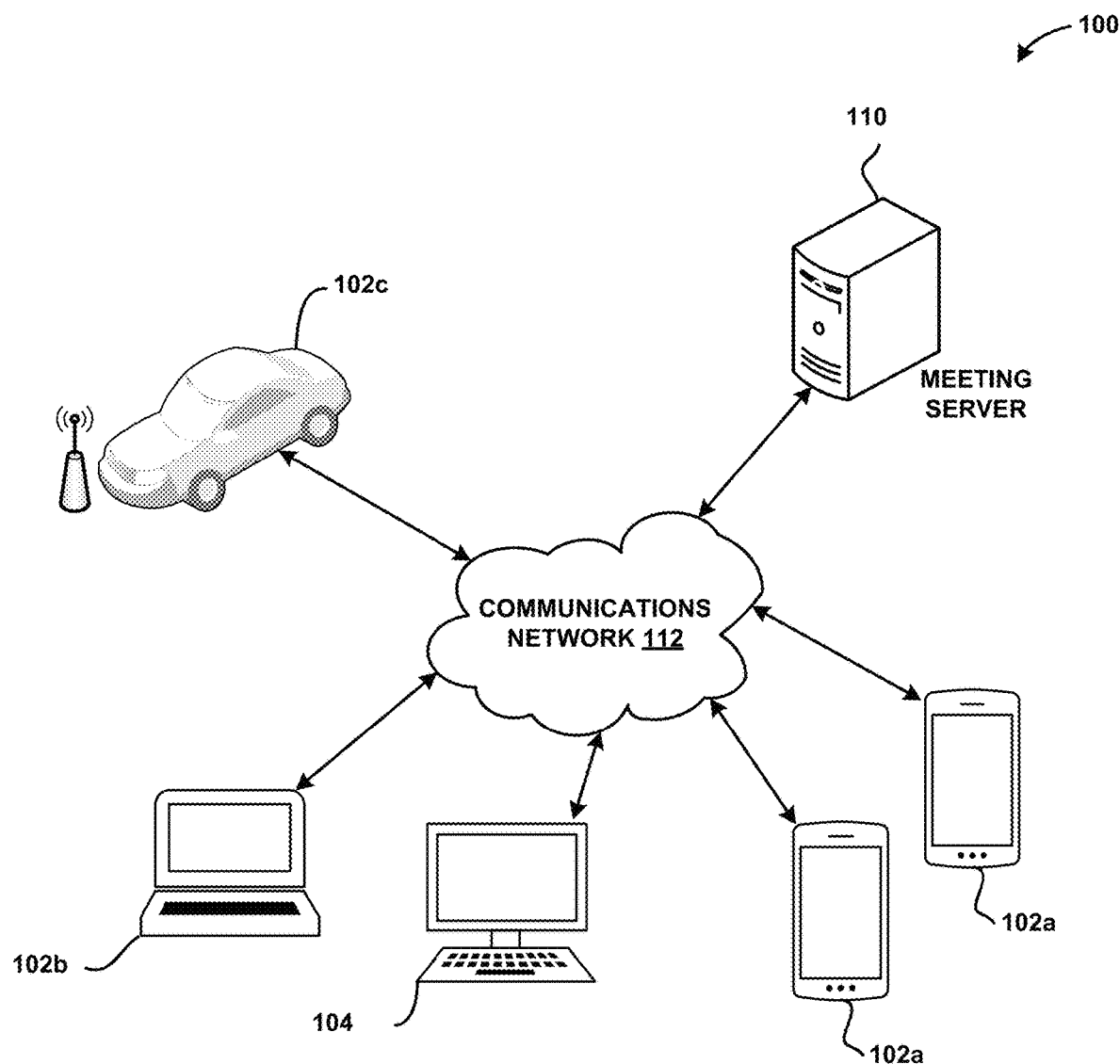
FIG. 1 is a simplified block diagram illustrating an example system utilizing a meeting scheduling system in accordance with an example embodiment of the present disclosure.

The present disclosure provides a method for managing a meeting session. A meeting application is provided on a plurality of electronic devices, such as mobile wireless communication devices ("mobile devices"). Two or more mobile devices executing the meeting application connect to a meeting session. Typically, each mobile device connects to the meeting session as either the presenter or a participant. The meeting application provides both the presenter and the participants with messaging features that allow the presenter to efficiently receive and gather input and data from participants, including participant engagement and desire for a meeting break. The gathered information may then be used by the presenter, or algorithms within the meeting application, to schedule breaks at more optimal times, with less downtime and with more optimal start times and stop times.

In accordance with an example embodiment of one aspect of the present disclosure, there is provided a method of managing a meeting session comprising one or more participant devices and a presenter device, the method performed by a server that manages the meeting session, the method comprising: receiving one or more break request messages from the participant devices; and sending a break message to the participant devices, the break message causing a break notification to be displayed on a display of the participant devices.

In accordance with another embodiment of one aspect of the present disclosure, there is provided a method of managing a meeting session comprising one or more participant devices and a presenter device, the method performed by one of the participant devices, the method comprising: sending a break request message to a server that manages the meeting session; and displaying a break notification on a display of the participant device in response to receiving a break message from the server.

In accordance with a further embodiment of one aspect of the present disclosure, there is provided a method of managing a meeting session comprising one or more participant devices and a presenter device, the method performed by one of the participant devices, the method comprising: sending activity information indicating whether the meeting session is active or inactive on the participant device to a server that manages the meeting session; and displaying a break notification on a display of the participant device in response to receiving a break message from the server, wherein the break message is sent automatically by the server when the meeting session is inactive on a threshold number of participant devices.

In accordance with a further example embodiment of one aspect of the present disclosure, there is provided a client-server method which results from the combination of the client methods and server methods.

In accordance with an example embodiment of another aspect of the present disclosure, there are provided electronic devices comprising a processor and a memory, wherein the memory has stored thereon executable instructions that, when executed by the processor, configure the processor to perform one or more of the methods described herein. The electronic devices may be mobile devices/computers configured to perform client methods of a participant device, server methods of a meeting server described herein, or both. The mobile devices/computers may further comprise a display and an input device coupled to the processor.

In accordance with an example embodiment of a further aspect of the present disclosure, there is provided a communication system comprising a meeting service and one or more participant devices configured to perform the methods described herein.

In accordance with an example embodiment of a further aspect of the present disclosure, there is provided a non-transitory machine readable medium having tangibly stored thereon executable instructions that, when executed by a processor of a mobile wireless communications device, cause the processor to perform one or more of the methods described herein.

The following detailed description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications may be made to the components illustrated in the drawings, and the example methods described herein may be modified by substituting, reordering, or adding steps to the disclosed methods. Accordingly, the foregoing general description and the following detailed description provide examples only and are not intended to be limiting. Instead, the proper scope is defined by the appended claims.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and components have not been described in detail so as not to obscure the example embodiments described herein.

Example Communication System

Reference is first made to FIG. 1 which shows in simplified block diagram form an example communication system 100 ("system") utilizing a meeting application 200 (FIG. 2) for managing meeting sessions. The system 100 includes a communications network 112 that enables a plurality of communication devices to exchange data. The network 112 may be any type of network capable of enabling a plurality of communication devices to exchange data such as, for example, a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), which is also referred to as a wireless wide area network (WWAN) or a cellular network. The network 112 may comprise a plurality of the aforementioned network types coupled via appropriate methods known in the art.

The system 100 may include a number of mobile wireless communications devices 102 coupled to the network 112, one or more computers 104 coupled to the network 112 and a meeting server 110. Devices 102, 104 may communicate securely using, for example, Transport Layer Security (TLS) or its predecessor Secure Sockets Layer (SSL). TLS and SSL are cryptographic protocols which provide communications security over the Internet. TLS and SSL encrypt network connections above the transport layer using symmetric cryptography for privacy and a keyed message authentication code for message reliability. Devices 102, 104 engaged in secure communications using TSL or SSL are provided with encryption key(s), which are typically stored in persistent memory of the Devices 102, 104.

The mobile devices 102 may include, but are not limited to, one or more handheld devices represented by reference 102a, such as smartphones or tablets, one or more laptop or notebook computers (also known as a netbook or ultrabook computer depending on the device capabilities) represented by reference 102b, or possibly one or more vehicles represented by reference 102c having an embedded-wireless communication system, such as a Wi-Fi™ or cellular equipped in-dash infotainment system. The mobile devices 102 may include devices equipped for cellular communication through PLMN or PSTN, mobile devices equipped for Wi-Fi™ communications over WLAN or WAN, or dual-mode devices capable of both cellular and Wi-Fi™ communications. In addition to cellular and Wi-Fi™ communications, the mobile devices 102 may also be equipped for Bluetooth™ and/or NFC (near-field communication) communications.

The computers 104 may include any computing device equipped for communicating over LAN, WLAN, Bluetooth, WAN, PSTN, PLMN, or any combination thereof. For example, the computers 104 may be a personal computer such as a desktop computer. While FIG. 1 illustrates the system 100 as having four mobile devices 102 and one computer 104, the depicted number of mobile devices 102 and computers 104 is for illustrative purposes only. The system 100 may comprise any number of mobile devices 102, computers 104 or combinations thereof.

In various embodiments, the mobile devices 102 are configured to operate in compliance with any one or more of a number of wireless protocols, including GSM, GPRS, CDMA, EDGE, UMTS, EvDO, HSPA, 3GPP, or a variety of others. It will be appreciated that the mobile devices 102 may roam within and across PLMNs. In some instances, the mobile devices 102 are configured to facilitate roaming between PLMNs and WLANs or WANs, and are thus capable of seamlessly transferring sessions from a coupling with a cellular interface to a WLAN or WAN interface, and vice versa.

The meeting server 110 comprises one or more computers, each comprising memory and one or more processors that are configured by one or more server modules stored in the memory, to provide server functions for the meeting application 200 described below. The server computer(s) may include one or more input devices and display. Suitable server computer constructions are known in the art and will not be described herein. In other embodiments, one of the devices 102, 104 (i.e., mobile device or computer) in the meeting session is acts as a server agent providing the functions of the meeting server 110 as well as acts as a client rather than have a dedicated meeting server 110. In such embodiments, the mobile device 102 or computer 104 acting as the server agent is typically the presenter device but may be a participant device. For example, it is contemplated that a meeting application 200 (FIG. 2) may be downloaded by the devices 102, 104 that allows any of one of the devices 102, 104 to act as the server, client or both.

In the present disclosure, a single presenter is described for convenience. However, the teachings of the present disclosure apply to systems and methods in which there are multiple presenters. For example, several individual presenters may share the same device 102, 104. Alternatively, each presenter may have their own device 102, 104 and the role of the meeting presenter and control of the meeting session may be switched between presenters and their devices 102, 104 using the meeting application 200 so that there is one only presenter at any given time.

The server functions of the meeting server 110 include providing authentication and authorization for a meeting (e.g., login), providing content (e.g., streamed video or presentation) to participant devices for display in a participant meeting user interface presented on the participant devices, providing messaging functions for handling chat sessions between participants logged into the meeting application 200, and receiving questions submitted to the presenter from participants and providing to the presenter, among other functions. The implementation of such features and functions is known in the art, examples of which are the meeting servers provided by BlackBerry Meetings™ or BB Meetings™ from BlackBerry Limited, WebEx™ from Cisco Systems, Inc. or GoToMeeting™ from Citrix Systems, Inc.

In addition to the features and functions of known meeting servers, such as those described above, the meeting server 110 receives messages from participant devices regarding meeting breaks and meeting engagement (such as break request messages), receives user activity information and/or application activity information from participant devices, aggregates and analyses the received messages and information, and shares anonymized, aggregated and analysed data with the presenter(s) and possibly participants. The meeting server 110 may also anonymize data extracted from the received messages and information when the messages and information received from participant devices is not already anonymized, i.e. when the received messages and information includes identifying information about the participants (e.g., names). The operation of such features and functions is described more fully below.

Example Mobile Device 102 and Computer 104

Figure 2:
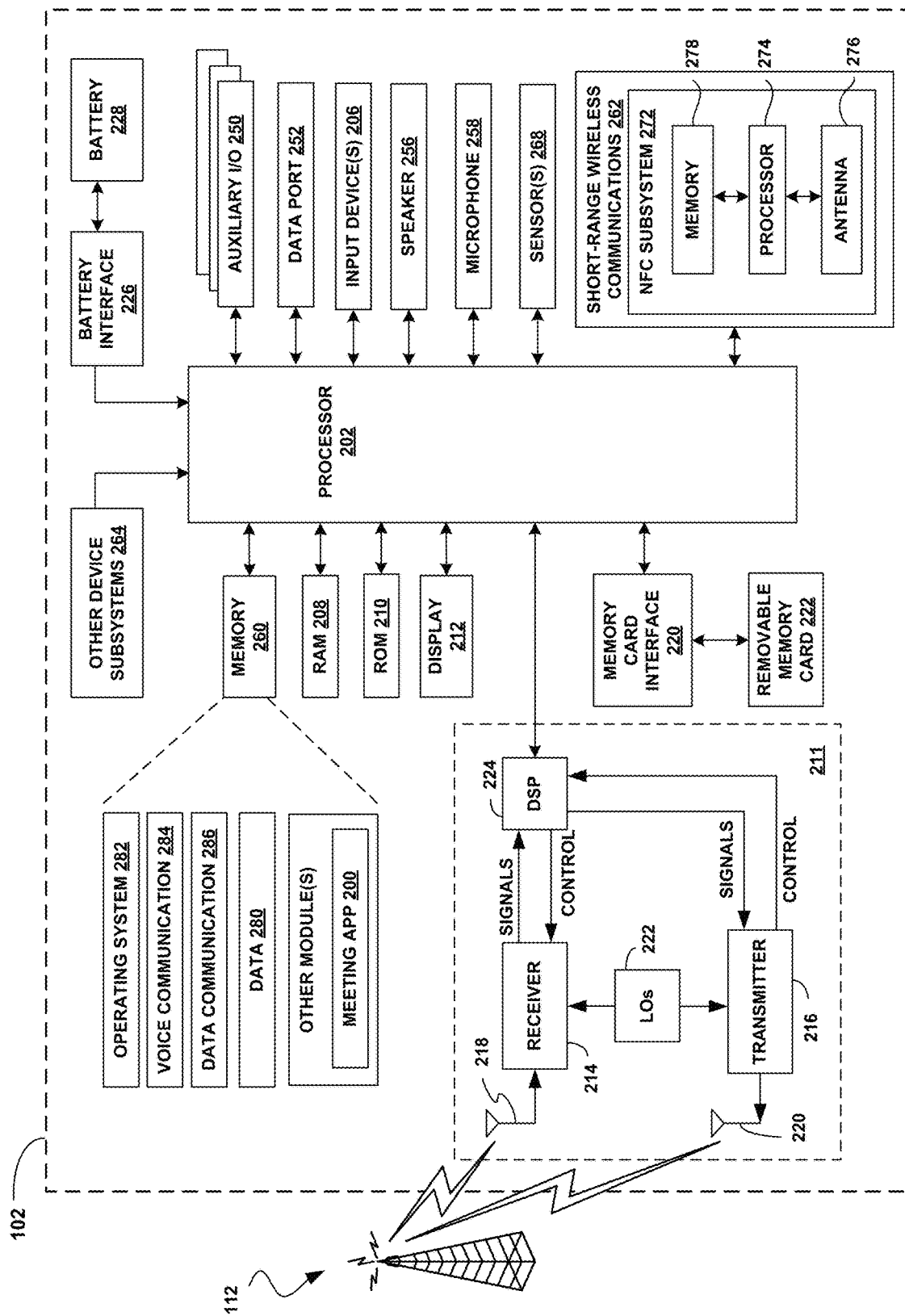
FIG. 2 is a simplified block diagram illustrating a mobile wireless communications device in accordance with an example embodiment of the present disclosure.

Reference is next made to FIG. 2 which illustrates in simplified block diagram form a mobile device 102 in which example embodiments described in the present disclosure may be applied. The mobile device 102 illustratively includes a rigid case or housing (not shown) which carries the electronic components of the mobile device 102. The housing may be elongated vertically, or may take on other sizes and shapes (including clamshell housing structures). The mobile device 102 includes a controller comprising at least one processor 202 (such as a microprocessor) which controls the overall operation of the mobile device 102.

The processor 202 interacts with other components, such as input device(s) 206, Random Access Memory (RAM) 208, Read Only Memory (ROM) 210, wireless communications subsystem 211 for exchanging radio frequency signals with a wireless network that is part of the network 112, a display 212 such as a color liquid crystal display (LCD) or active-matrix organic light-emitting diode (AMOLED) display, persistent (non-volatile) memory 260 which may be flash erasable programmable read only memory (EPROM) memory (flash memory) or other suitable form of memory, sensor(s) 268 such as a motion sensor, an orientation sensor and/or proximity sensor, auxiliary input/output (I/O) subsystems 250, data port 252 such as serial data port (e.g., Universal Serial Bus (USB) data port), speaker 256, microphone 258, a short-range communications subsystem 262, and other device subsystems 264 such as a camera, global positioning system (GPS), vibrator or light-emitting diode (LED) notification light. The components of the mobile device 102 are coupled via a communications bus (not shown) which provides a communication path between the various components.

The input device(s) 206 may include a keyboard or keypad, one or more buttons, one or more switches, a touchpad, a rocker switch, a thumbwheel, or other type of input device. In addition to or instead of a keyboard or keypad, the display 212 may be provided as part of a touchscreen or touch-sensitive display which provides an input device 206. The display 212 which together with a touch-sensitive overlay (not shown) operably coupled to an electronic controller (not shown) may comprise the touch-sensitive display. The touch-sensitive display is typically a capacitive touch-sensitive display which includes a capacitive touch-sensitive overlay.

User-interaction with a graphical user interface (GUI) presented on the display 212 performed using the input devices 206. Information, such as text, characters, symbols, images, icons, and other items are rendered and displayed on the display 212 via the processor 202. The processor 202 may interact with one or more sensors 268, such as the orientation sensor to detect direction of gravitational forces or gravity-induced reaction forces so as to determine, for example, the orientation of the mobile device 102 in order to determine a screen orientation for the GUI.

Operating system software 282 executed by the processor 202 is stored in the persistent memory 260, such as flash memory, but may be stored in other types of memory devices, such as ROM 210 or similar storage element. User data 280 is also stored in the persistent memory 260. System software, software modules, specific device applications, or parts thereof, may be temporarily loaded into a volatile store, such as RAM 208, which is used for storing runtime data variables and other types of data or information. Communications signals received by the mobile device 102 may also be stored in the RAM 208. Although specific functions are described for various types of memory, this is merely one example, and a different assignment of functions to types of memory may be used in other embodiments.

The processor 202, in addition to its operating system functions, enables execution of software applications on the mobile device 102. A predetermined set of applications or software modules that control basic device operations, such as voice communications module 284, data communications module 286, may be installed on the mobile device 102 during manufacture. The data 280 includes installed applications and user data, such as saved files, among other data. The installed applications in the data 280 include the meeting application 200 that, when executed by the processor 202, causes the operations of the below-described methods to be performed. In some embodiments, the meeting application 200 may be adapted to configure the mobile device 102 to act as either a participant or a presenter, and as either a client or a server, during a meeting session as described below. In other embodiments, the meeting application may be a dedicated client application for a meeting participant or a dedicated server application for a meeting presenter.

A personal information manager (PIM) application may be installed during manufacture. The PIM may be capable of organizing and managing data items, such as email, calendar events, voice mails, appointments, and task items. The PIM application may also be capable of sending and receiving data items via the wireless network. The PIM data items may be seamlessly integrated, synchronized and updated via the wireless network with corresponding data items stored or associated with a host computer system. New applications and updates to installed applications may be installed by the user, for example, via the Internet.

The mobile device 102 is a two-way wireless Radio Frequency (RF) communications device having data and/or voice communications capabilities. In addition, the mobile device 102 may have the capability to communicate with other computer systems via the Internet. The wireless communication subsystem 211 exchanges radio frequency signals with the wireless network. The wireless communication subsystem 211 comprises a wireless Wide Area Network (WAN) communication subsystem for two-way communication with a wireless WAN, such as a cellular network. The mobile device 102 may communicate with any one of a plurality of fixed transceiver base stations (not shown) of the wireless network within its geographic coverage area. The mobile device 102 may send and receive communication signals over the wireless network after the required network registration or activation procedures have been completed. In addition, the wireless communication subsystem 211 may comprise a Wireless Local Area Network (WLAN) communication subsystem for two-way communication with a WLAN via wireless access points (not shown), e.g. Wi-Fi™.

Communication functions, including data and voice communications, are performed through the communications subsystem 211 and possibly through the short-range communications subsystem 262 (e.g., using the NFC subsystem 272). Data received by the mobile device 102 may be decompressed and decrypted by a decoder (not shown). The communications subsystem 211 includes a receiver 218, a transmitter 216, and one or more antennas 218 and 220. In addition, the communications subsystem 211 also includes a processor, such as a digital signal processor (DSP) 224, and local oscillators (LOs) 222. The specific design and implementation of the communications subsystem 211 is dependent upon the wireless communications network(s) 104 in which the mobile device 102 is intended to operate.

Network access requirements vary depending upon the type of communication system. For example, in GPRS networks, network access is associated with a subscriber or user of a device. The mobile device 102 also includes a memory card interface 220 for receiving a removable memory card 222 comprising persistent memory, such as flash memory, having subscriber identity data stored thereon. The memory card 222 may be inserted in or coupled to the memory card interface 220 for storing and reading data by the processor 202.

When required network registration or activation procedures have been completed, the mobile device 102 may send and receive communications signals over the communication network. Signals received by the antenna 218 through the wireless network are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network via the antenna 220.

In addition to processing communications signals, the DSP 224 provides for control of the receiver 214 and the transmitter 216. For example, the gains applied to communication signals in the receiver 214 and the transmitter 216 may be adaptively controlled through automatic gain control algorithms implemented in the DSP 224.

In a data communications mode, a received signal, such as a text message or web page download, is processed by the communications subsystem 211 and is input to the processor 202. The received signal is then further processed by the processor 202 for an output to the display 212, or alternatively to some other auxiliary I/O device 250. The mobile device 102 may also be used to compose data items, such as email messages, using the input device(s) 206 and/or some other auxiliary I/O device 250. The composed data items may then be transmitted over the wireless network via the communications subsystem 211.

In a voice communications mode, overall operation of the device is substantially similar to the data communications mode, except that received signals are output to a speaker 256, and signals for transmission are generated by a microphone 258. Alternative voice or audio I/O subsystems, such as a voice message recording subsystem, may also be implemented on the mobile device 102. In addition, the display 212 may also be utilized in voice communications mode, for example to display the identity of a calling party, the duration of a voice call, or other voice call related information.

The short-range communications subsystem 262 enables communication between the mobile device 102 and other proximate systems or devices, which need not necessarily be similar devices. The short-range communications subsystem 262 includes an NFC subsystem 272 for communicating with another mobile wireless communications device via NFC communications. The NFC subsystem 272 may also be used for communicating with an NFC device or NFC tag via NFC communications.

The short-range communications subsystem 262 may also include devices, associated circuits and components for providing other types of short-range wireless communication such as Bluetooth™, IEEE 802.11, IEEE 802.15.3a (also referred to as UltraWideband (UWB)), Z-Wave, Zig-Bee, or infrared such as an Infrared Data Association (IrDA) communications, as well as a corresponding communications module in persistent memory 260 to provide for communication with similarly-enabled systems and devices.

The mobile device 102 also includes a battery 228 as a power source, which is typically one or more rechargeable batteries that may be charged, for example, through charging circuitry coupled to a battery interface such as the serial data port 252. The battery 228 provides electrical power to at least some of the components of the mobile device 102, and the battery interface 226 provides a mechanical and electrical connection for the battery 228. The battery interface 226 is coupled to a regulator (not shown) which provides power V+ to the circuitry of the mobile device 102.

Computers 104, which are well known in the art, have a construction similar to the mobile device 102 with notable differences including the form factor (e.g., size and shape) of the hardware, selection of hardware components, and access to a direct power supply rather than a battery 228.

Method, User Interface and System for Managing a Meeting Session

Referring again to FIG. 1, a meeting application 200 (FIG. 2) is provided on a plurality of devices, which may be mobile devices 102 or computers 104. The devices 102, 104 execute the meeting application 200 installed thereon or access the meeting application via an Internet browser by connecting to the Internet. Users log in to a meeting session, typically using a meeting ID, user name (such as a name or email address) and access code. When user pre-registration is required, users may provide their name, email address and possibly other identifying information to the meeting server 110 in advance so that users may use their email address for login purposes and their name may be automatically retrieved for use by the meeting server 110, for example, for use in an attendee list and for messaging features such as submitting questions to the presenter and chatting.

Typically, one of the devices 102, 104 enters the meeting session as a presenter device and the other devices 102, 104 enter the meeting session as participant device (or attendee devices). The meeting application 200 may differentiate the presenter from participants using the access code, and thereafter (or until switched) associate their devices 102, 104 as either the presenter device or a participant device for the duration of the meeting session using identifying information about the devices 102, 104 associated with the respective connections between the devices 102, 104 and the meeting server 110. For example, one access code may be assigned for use by the presenter and another access code may be used by participants.

When there is more than one presenter that each has their own device 102, 104, the role of the meeting presenter and control of the meeting session may be switched between presenters and their devices 102, 104 using the meeting application 200 so that there is one only active presenter at any given time. The meeting application 200 may be configured to receive input selecting a new meeting presenter from one of the meeting participants (or attendees) as the active presenter. It is contemplated that more than one user may be designated as a presenter in advance of the meeting—each could be given a unique access code that uniquely identifies the user as well as the status of the users as a meeting presenter. When this input is received, the meeting server 110 thereafter associates the device 102, 104 of the new meeting presenter as the presenter device for at least some functions and other devices, including the previous meeting presenter(s), as participant devices for those same functions. In some embodiments, switching the presenter switches control over the content panel 510 and the question function while allowing other meeting presenters to view break information, such as the participant engagement panel 530 when the meeting application 200 is in a meeting mode and the break status panel 570 when the meeting application 200 is in a break mode.

The meeting associated with the meeting session may be at least partially virtual in that one or more meeting participants may be located remotely from the meeting room and access the meeting session only via their device 102, 104. It is contemplated that the meeting may be entirely virtual in that there is no meeting room and that all meeting participants access the meeting session only via their device 102, 104. In some cases, each of the meeting participants may be located at different physical locations. Throughout the disclosure, the term "meeting" is intended to refer to either an in-person meeting occurring at least partially in a meeting room or a virtual meeting, and the term "meeting session" is used to refer to the communications session created between participant devices and the presenter device using the meeting application 200. Also, the terms "participants" and "attendees" are used interchangeably herein even in the context of a virtual meeting the user does not physically attend.

Figure 4A:
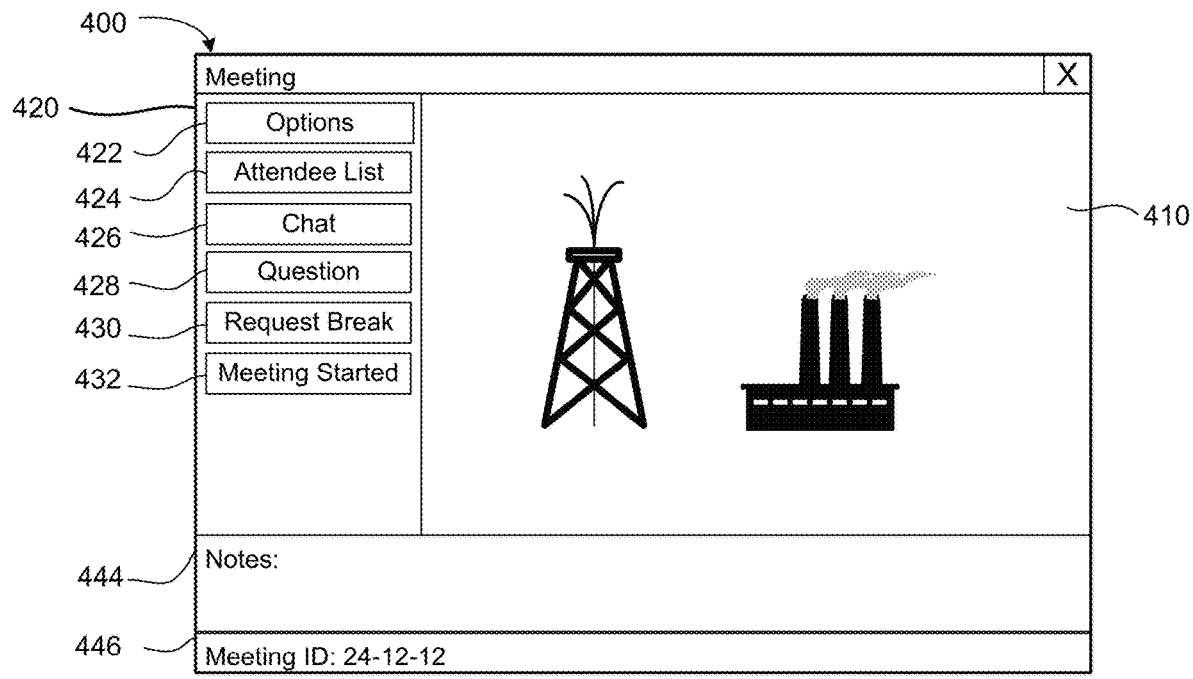
FIGS. 4A to 4F are diagrammatic views of example user interface screens of a meeting application user interface for a meeting participant in accordance with example embodiments of the present disclosure.

FIG. 4A shows a diagrammatic view of a participant meeting session user interface screen 400 of the meeting application 200 for a meeting participant in accordance with one example embodiment of the present disclosure. The participant meeting session screen 400 is used to view meeting content such as streamed video or a presentation in a content panel or window 410 and a control panel 420. In the shown embodiment, the control panel 420 includes an "Options" button 422 for configuring a variety meeting options, such as audio settings (e.g., volume level, mute, etc.). Selecting the "Options" button 422 causes an Options user interface (e.g., menu, window or dialog box) to be displayed on the display of the participant device. The Options user interface includes user interface elements for configuring meeting options, for example, as an overlay or "popup" window at least partially overlaying the participant meeting session screen 400. In the shown embodiment, the control panel 420 includes an Attendee List button 424 that may be used to display the meeting attendees, for example, in an expansion window within the participant meeting session screen 400 or an overlay window. In the shown embodiment, the participant meeting session screen 400 also includes a Meeting ID Field 446 that includes a meeting identifier (ID), which in the shown example, is 24-12-12.

In the shown embodiment, the participant meeting session screen 400 includes a Notes Field 444 that may be used by meeting participants to take Notes. Text entered in the Notes Field 444 may be saved in a data file stored on the device 102, 104, possibly with a copied of the presented content (e.g., a presentation file corresponding to a presentation, or a video file including a recording of streamed content). In the shown embodiment, the participant meeting session screen 400 also includes a Question button 428 that may be used by meeting participants to submit questions to the meeting presenter. Questions are submitted using a Question user interface (e.g., menu, window or dialog box) which is displayed in response to selecting the Question button 428. The Question user interface may be a simple text entry field in the overlay window at least partially overlaying the participant meeting session screen 400. Questions submitted are received by and distributed to the meeting presenter by the meeting server 110.

Chatting may be performed using a Chat user interface (e.g., menu, window or dialog box) which is displayed in response to selecting a Chat button 426. The Chat user interface may be a simple text entry field in an overlay window at least partially overlaying the participant meeting session screen 400. Chat messages are typically sent only to one or more other meeting participants selected by the user. Alternatively, the chat messages may be sent to all participants. The chat messages are received and distributed to participants by the meeting server 110.

The participant meeting session screen 400 also includes a "Request Break" button 430. When the "Request Break" button 430 is selected, the meeting application 200 sends a break request message to the meeting server 110. The meeting server 110 sends the break request information to the presenter device for display in a presenter meeting session user interface screen 500, described below. In some embodiments, the meeting server 110 aggregates and/or anonymizes the break request information before sending it to presenter device.

Figure 5A:
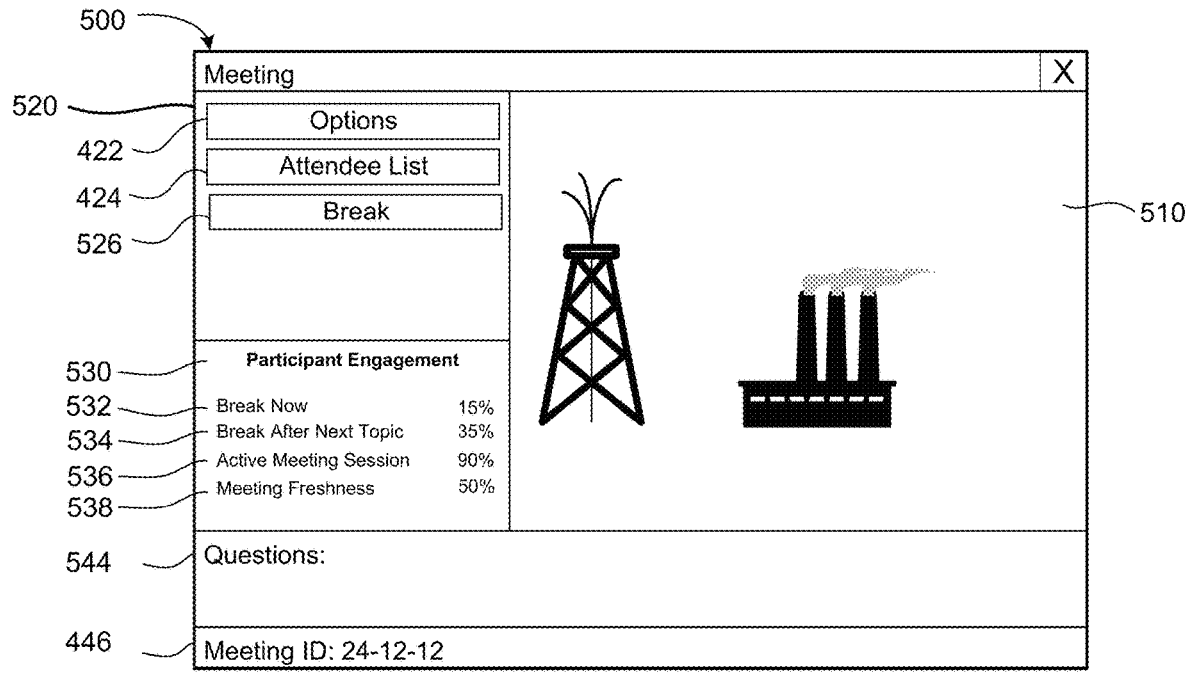
FIGS. 5A to 5D are diagrammatic views of example user interface screens of a meeting application user interface for a meeting presenter in accordance with examples embodiment of the present disclosure.
Figure 5B:
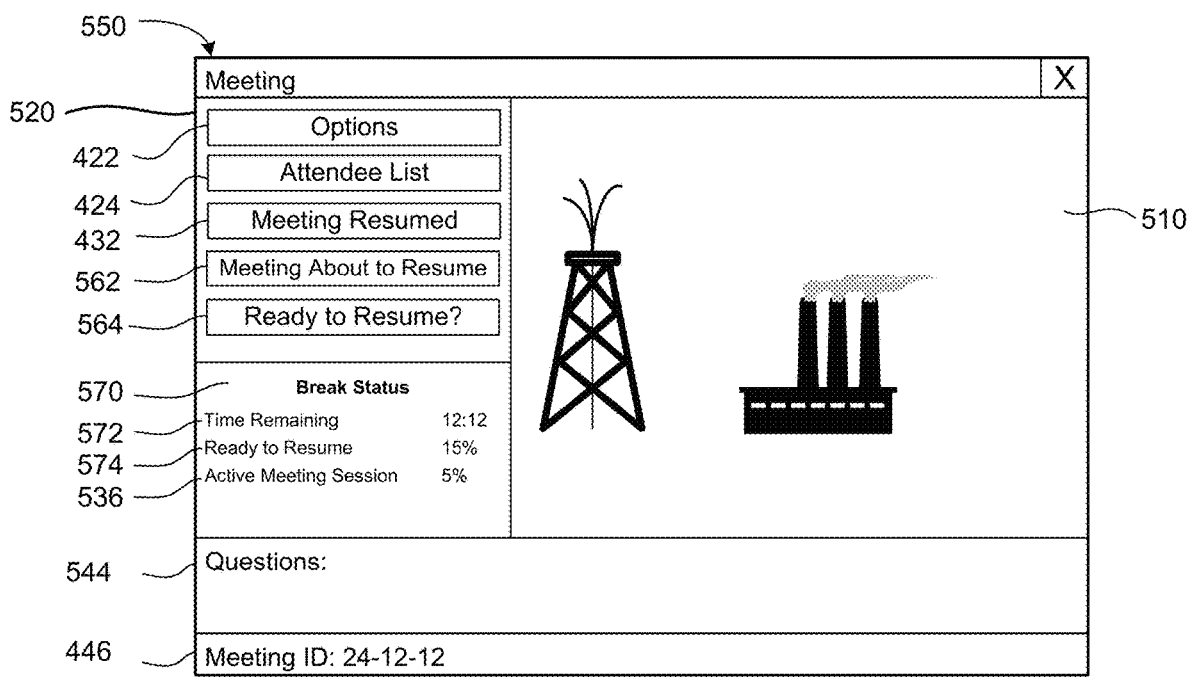
Figure 5C:
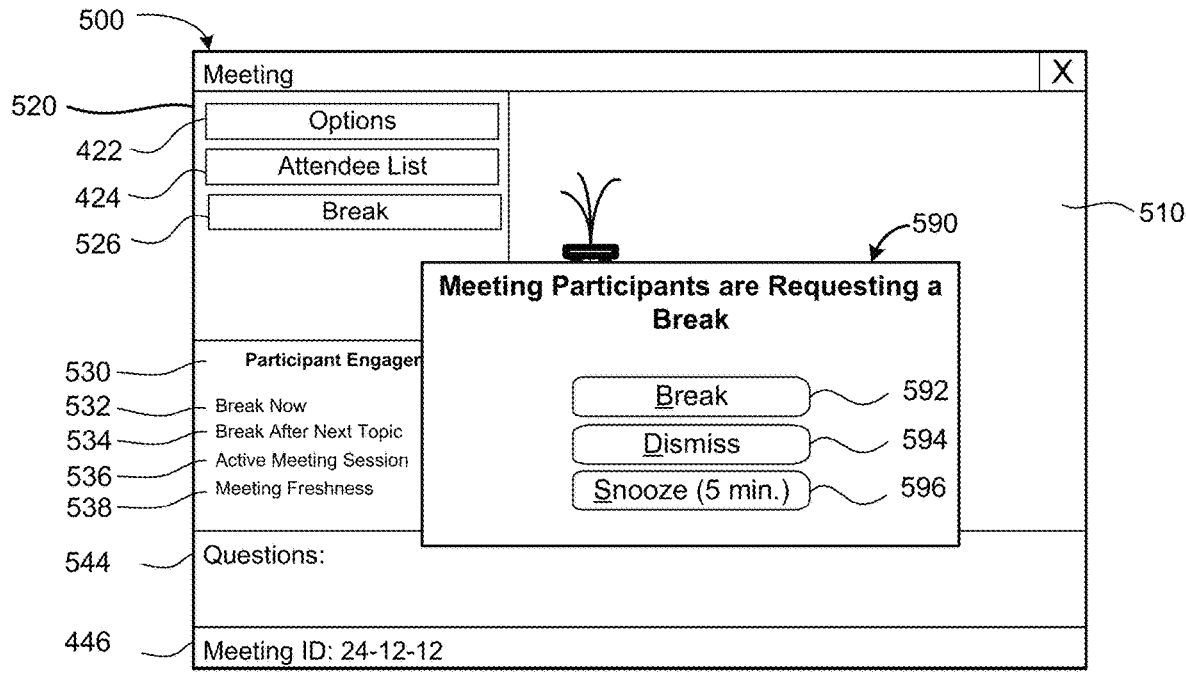

In some embodiments, the meeting application 200 automatically displays a break request message 590 on the display of presenter device when a threshold number (or percentage) of break requests are received, an example of which is shown in FIG. 5C. The threshold may have a default value and may be configurable, for example by the meeting presenter or the meeting server 110. The threshold number may be a simple majority based on the number of meeting participants. The threshold may be based on a priority of the meeting.

The break request message 590 is displayed in a meeting view of the presenter meeting session screen 500. In the shown embodiment, the break request message 590 is an overlay window (or dialog box) at least partially overlaying the presenter meeting session screen 500, such as the currently presented material in a content panel 510. The presenter may choose to break the meeting at the next appropriate time or a break may be automatically triggered by the meeting server 110, as described below.

In the shown embodiment, the break request message 590 includes three selectable option buttons which are "Break" 592, "Dismiss" 594 and "Snooze (5 min.)" 596. In at least one embodiment, the device user can select one of the options using designated input (e.g., touching a corresponding location on a touchscreen, pressing a corresponding key in a keyboard (the corresponding key being underlined in the option buttons 592, 594 and 596).

Selecting the "Break" button 592 using designated input will cause the meeting application 200, via the meeting server 110, to trigger a break manually based on user input rather than automatically. Thus, a meeting presenter can select the "Break" button 592 using designated input to manually trigger a meeting break in the same manner as the "Break" button 526 of the presenter meeting session screen 500, described below. When a break is triggered, the break request message 590 is cleared from the display and a break notification is displayed on the display of participant devices and the device of the meeting presenter(s).

Selecting the "Dismiss" button 594 causes the application to dismiss the notification, meaning that the meeting presenter does not need to be notified again about the break request(s). This causes the break request message 590 to be cleared from the display of the device 102, 104 until trigger again by one or more new break request messages.

Selecting the "Snooze (5 min.)" button 596 causes the break request message 590 to be cleared from the display of the device 102, 104. However, the notification has been rescheduled rather than dismissed. The notification is queued to be re-displayed at a future time, in the shown example, in 5 minutes. After 5 minutes has elapsed from the time the "Snooze (5 min.)" button 596 was selected, the break request message 590 will be re-displayed. In some embodiments, the meeting application 200 will not notify the meeting presenter of new break requests during the snooze time duration, regardless of whether new break requests received by the meeting server 110 during the snooze time duration meet the thresholds for displaying the break request message 590.

Figure 8:
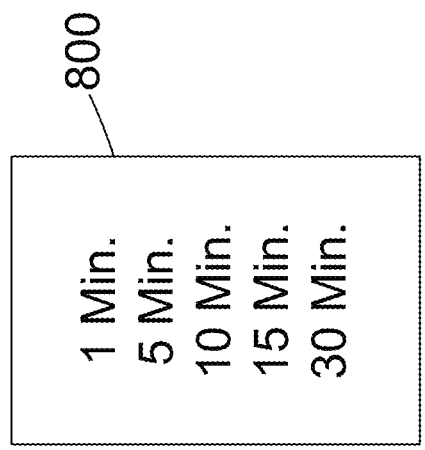
FIG. 8 is a diagrammatic view of an example selection list providing a plurality of selectable snooze time durations.

The snooze time duration may the selectable snooze option is configurable from within a settings or options screen of the meeting application 200 in some embodiments. FIG. 8 shows an example selection list 800 that may be generated within such an options screen. The selection list 800 includes a number of predefined snooze time durations that can be chosen, namely 1 minute, 5 minutes, 10 minutes, 15 minutes and 30 minutes.

Figure 9:
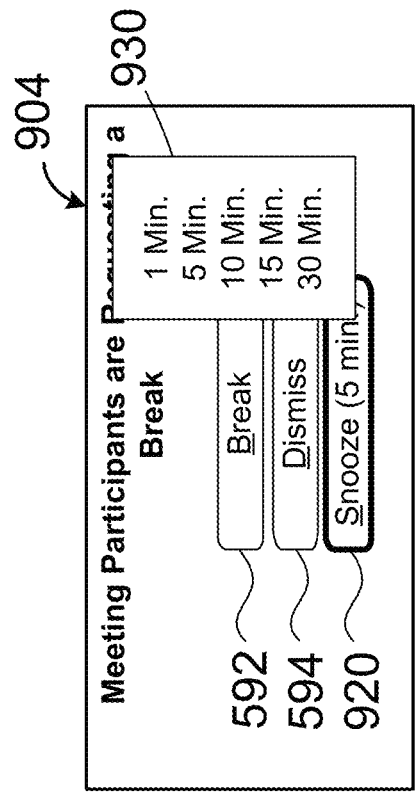
FIG. 9 a diagrammatic view of a break request message window in accordance with an alternate example embodiment of the present disclosure.
Figure 10:
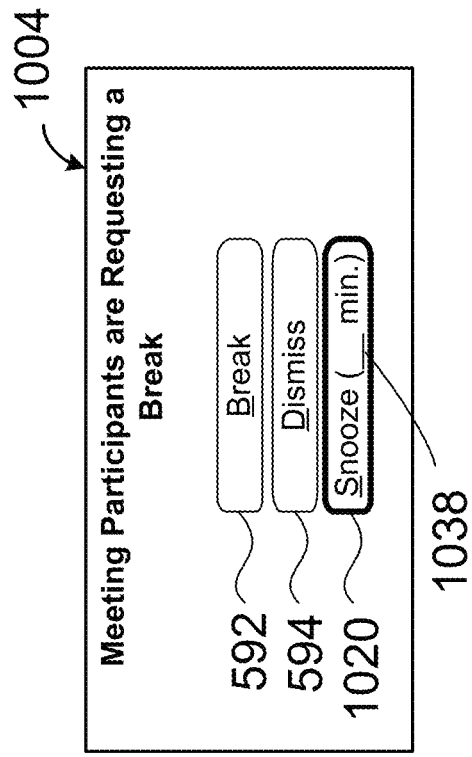
FIG. 10 is a diagrammatic view of a break request message window in accordance with an another alternate example embodiment of the present disclosure.

The snooze time duration may be set when the responding to the break request message 590 from within the event window in other example embodiments. FIGS. 9 and 10 illustrate two such embodiments. Referring to FIG. 9, break request message window 904 is similar to the break request message window 590 shown in FIG. 5C; however in addition to the device user being able to choose selectable snooze option 596 to snooze the break request message for a default amount of 5 minutes, the device user can also cause a selection list 930 to be displayed in response to designated input (e.g., gesture performed at snooze option 920 or selection (e.g., touching) a special function button(s) or key(s) while touching the snooze option 920) so that another snooze time duration listed within the selection list 930 may be selected. When a different snooze time duration is selected from the selection list 930, the selected snooze time duration will be displayed with the snooze option 920 in place of "(5 min.).

Other break request message windows 590 permitting the snooze time duration to be set at the time of displaying the break request message 590 are contemplated, and one such alternative break request message window 1004 is shown in FIG. 10. Here, once the device user has selected the selectable snooze option 1020, the device user can operate a keyboard (e.g., software or hardware) to type in the desired snooze time duration. This snooze time duration will appear within the area where the option 1020 is displayed and, more specifically, it will appear at cursor 1038.

The break request message 590 may also include a count, percentage and/or other information regarding the received break requests in some embodiments. In other embodiments, the break request message 590 may include a count, percentage and/or other information regarding the received break requests instead of the participant engagement panel 530. In the shown embodiment, the break request message 590 does not include such information because it is already presented in the presenter meeting session screen 500 in a participant engagement panel 530, described more fully below.

Figure 4B:
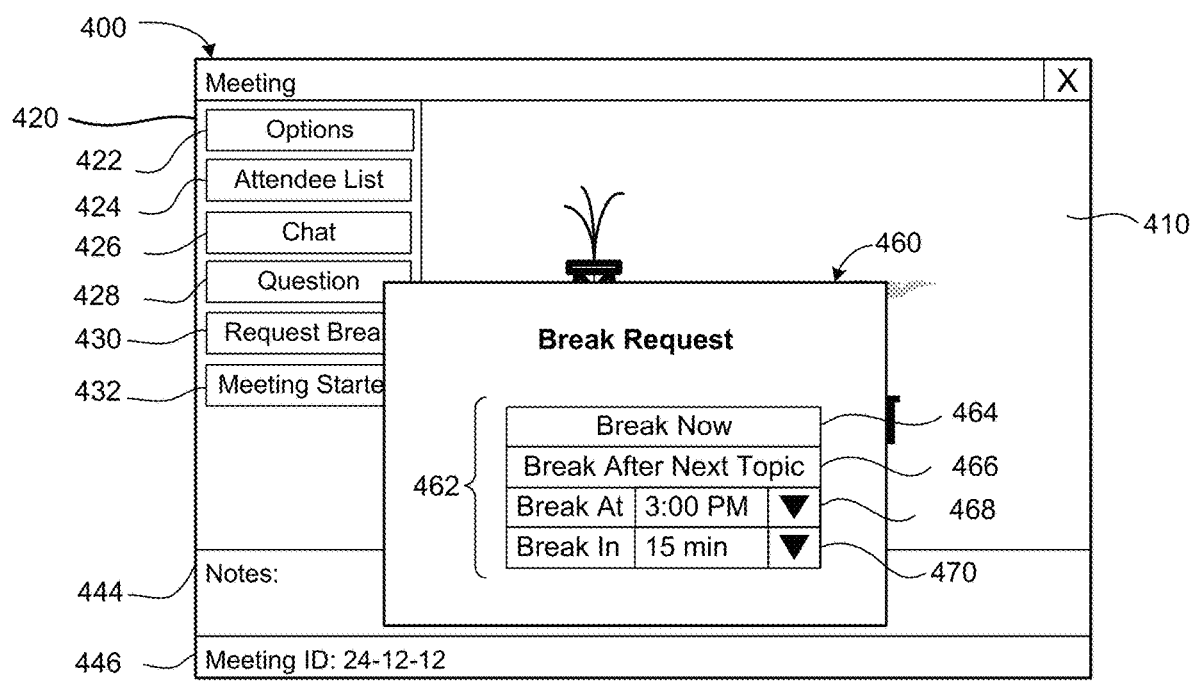

Reference is next made to FIG. 4B, which illustrates an example embodiment of a break request user interface 460 which includes time parameter options 462 in the form of onscreen buttons. In some embodiments, the break request user interface 460 is displayed when a user selects the "Request Break" button 430 using designated input. In the shown embodiment, the break request user interface 460 is an overlay window that at least partially overlays the participant meeting session screen 400.

The time parameter options 462 include (i) break now (immediately) represented by a "Break Now" button 464, and (ii) break after next topic represented by a "Break After Next Topic" button 466. In the shown embodiment of FIG. 4B, the time parameter options 462 also include (iii) break at a specific time represented by button 468 and (iv) break in a specified duration of time represented by button 470. The break at a specific time button 468 includes a time field in which a time at which a break is desired may be entered. The break in a specified duration button 470 includes a time duration in which a duration of time, for example in minutes, at which a break is desired may be entered.

A time parameter value corresponding to the selected time parameter option is sent to the meeting server 110 as part of the break request message. The time parameter options allow meeting participants to specify a severity with which a break is desired, and when provided to the meeting presenter, can be used to determine when to break the meeting. For example, the information may be used by the meeting presenter to determine whether to finish the current topic or whether to break before the current topic is finished.

In some embodiments, the time parameter options allow the meeting application 200 to automatically determine whether and/or when to trigger a meeting a break based on the received time parameter values and a set of one or more break rules for trigger a meeting break. In some embodiments, the decision when to break is based on determining whether a threshold number of meeting participants have indicated that they wish to break now, after the current topic is finished, or another time. The threshold may have a default value and may be configurable, for example by the meeting presenter or the meeting server 110. The threshold number may be a simple majority based on the number of meeting participants. The threshold may be based on a priority of the meeting.

In embodiments in which the time parameter options 462 are only break now (immediately) or break after next topic, two different thresholds may be used: a break now threshold, and a break after next topic threshold. Typically, the break after next topic threshold is lower than the break now threshold. For example, the break now threshold may be set at 15% (or an integer equivalent based on the number of participants) whereas the break after next topic threshold may be set at 25%. The break now threshold and the break after next topic threshold may be affected by the priority of the meeting, either at the discretion of the meeting presenter or automatically by the meeting server 110, for example, based on IT policies set by the IT administrator. The priority of the meeting may be defined by a value to assist in scheduling the meeting, such as when sending a meeting request and setting the break threshold, among other uses. For example, the priority of the meeting may be one of low, normal, or high. For another example, the priority of the meeting may be a numeric value on a numeric priority scale, such as a number between "1" and "5" with "1" being a highest priority and "5" being a lowest priority.

Figure 4C:
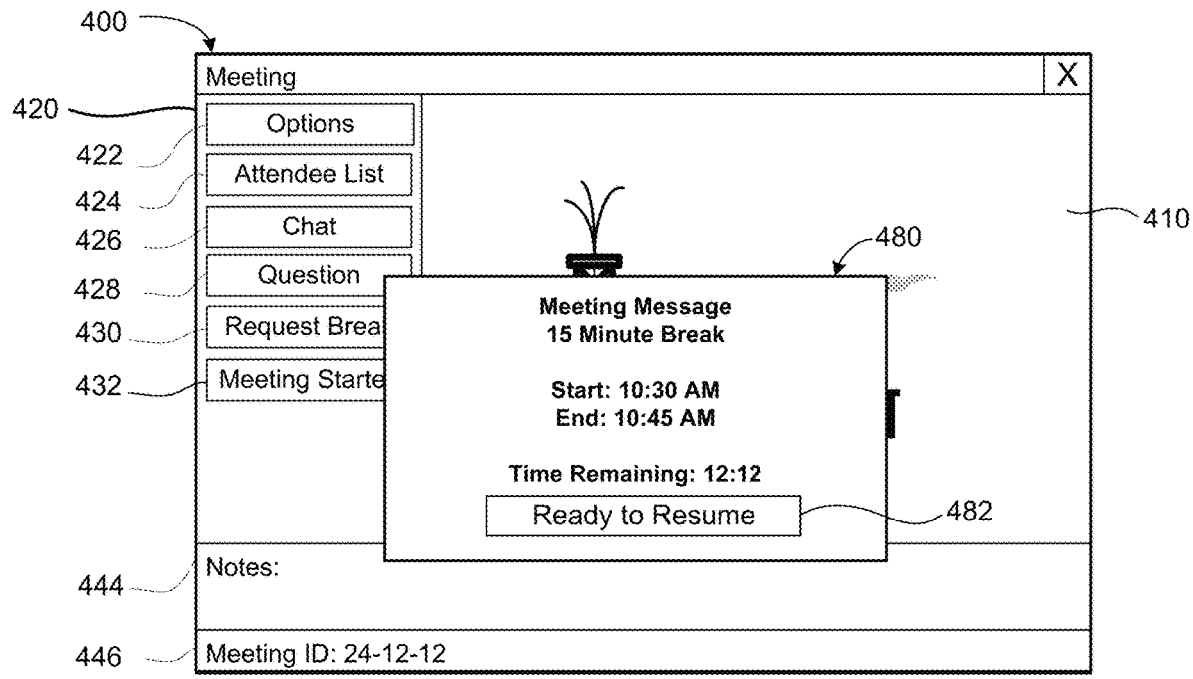

When the meeting breaks, the user interfaces of the meeting application 200 of the participants and/or presenter(s) transitions from a meeting mode to a break mode. For meeting participants, this comprises providing a break notification, for example, via a user interface window. Reference is next made to FIG. 4C, which illustrates an example embodiment of a break notification 480 which is displayed in response to a break message received by the participant device when a meeting break is initiated. The break notification 480 notifies meeting participants of a meeting break. In the shown embodiment, the break notification 480 includes a duration of the meeting break (15 minutes in the example), a start time (10:30 AM in the shown example), an end time (10:45 AM in the shown example), and a duration of the time remaining (12 minutes, 12 seconds in the shown example). A greater or less number of details may be provided in other embodiments. For example, the break notification 480 may include a simple notification that a meeting break is occurring without any details. This may be desirable when the meeting break has no set duration and starts at an unscheduled time, for example, such as when the meeting break is triggered based on the input of the meeting presenter rather than automatically in response to the one or more break rules.

In some embodiments, such as that shown in FIG. 4C, the break notification 480 includes a "Ready to Resume" button 482 for indicating that the meeting participant is ready to resume the meeting. Although the button 482 includes the label "Ready to Resume" in the shown embodiment, it may include other descriptive and intuitive labels in other embodiments such as "Ready to Begin" or "Ready to Start".

When the "Ready to Resume" button 482 is selected by a user, a status message is sent from the participant device to the meeting server 110, which in turn notifies the meeting presenter on the presenter device in a break view (or mode) of the presenter meeting session screen 550 as shown in FIG. 5B. The break view of the presenter meeting session screen 550 is presented during a meeting break. The break view of the presenter meeting session screen includes a break status panel 570 that includes a ready to resume indicator 574 representing a number of participants that are ready to resume the meeting based on the number of users selecting the "Ready to Resume" button 482.

Although in the shown embodiment of FIG. 4B the "Ready to Resume" button 482 is provided in the break notification 480 along with break details including a duration, start time, end time, and a time remaining, the Ready to Resume" button 482 is particularly advantageous in open meeting breaks with no set duration, start time or end time. In other embodiments, the "Ready to Resume" button 482 may be omitted.

Figure 4D:
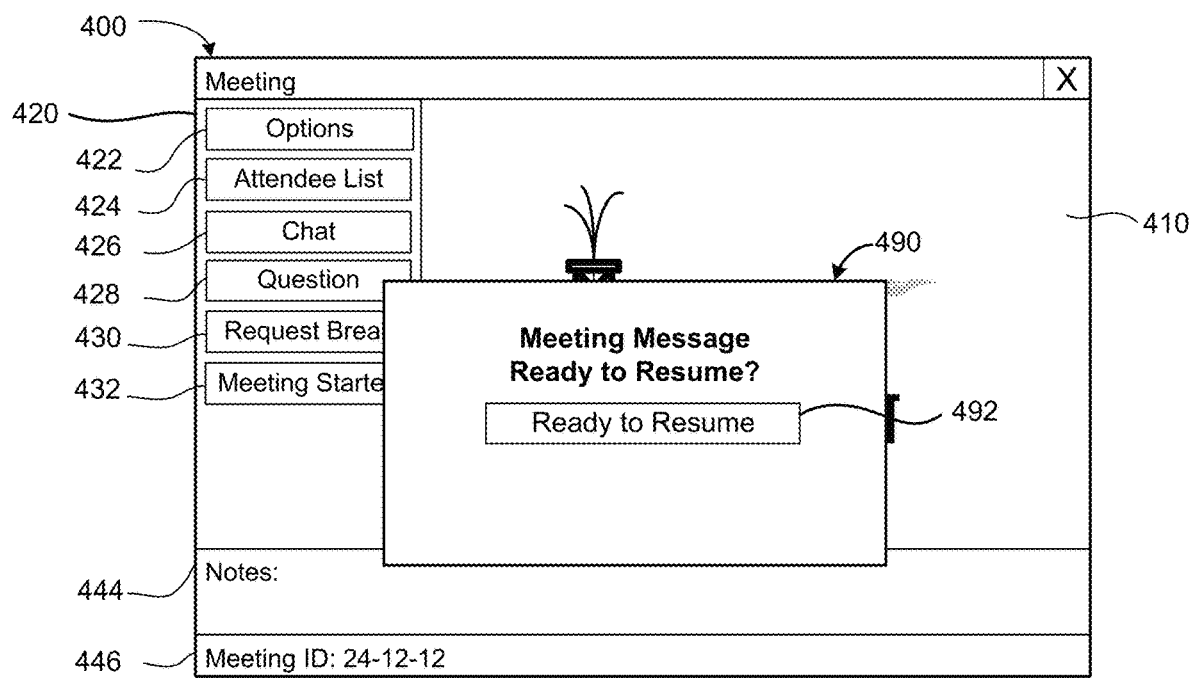

Reference is next made to FIG. 4D, which illustrates an example embodiment of a ready to resume notification 490 which is displayed in response to a selection of a "Ready to Resume?" button 564 by the meeting presenter in the break view of the presenter meeting session screen 550. The ready to resume notification 490 is displayed by the meeting application 200 in response to the meeting server 110 sending a status request message to the participant devices, which is sent by the meeting server 110 in response to receiving a status request message from the presenter device. The ready to resume notification 490 includes a "Ready to Resume" button 492 for indicating that the meeting participant is ready to resume the meeting. When the "Ready to Resume" button 492 is selected by the user, a status message is sent from the participant device to the meeting server 110, which in turn notifies the meeting presenter on the presenter device in the break view of the presenter meeting session screen 550, as shown in FIG. 5B.

In some embodiments, the meeting application 200 may automatically resume the meeting in response to status messages received by the meeting server 110 and one or more break rules for resuming a meeting. In some embodiments, the decision to resume the meeting is based on determining whether a threshold number of meeting participants have indicated that they are ready to resume the meeting (as indicated by the ready to resume messages sent by selecting the "Ready to Resume" button 482. The threshold may have a default value and may be configurable, for example by the meeting presenter or the meeting server 110. The threshold number may be a simple majority based on the number of meeting participants. The threshold may be based on a priority of the meeting. When the meeting resumes after the break, the user interfaces of the meeting application 200 of the participants and presenter(s) are transitioned from the break mode to the meeting mode. This typically comprises resetting (clearing) any and all break related windows are cleared from the participant and presenter meeting session user interface screens, resetting the participant engagement panel 530 and associated information if this was not done when the break commenced, resetting the break status panel 570 and associated information is reset (cleared), and changing the presenter meeting session screen from the break mode to the meeting mode. Transitioning from the break mode to the meeting mode may also comprise displaying the "Meeting resumed" notification 496 (FIG. 4F) to be displayed on participant devices.

When the break has a set duration and/or end time, the user interfaces of the meeting application 200 of the participants and presenter(s) transition automatically from the break mode to the meeting mode at the end of the meeting break. However, in embodiments in which the meeting application 200 may automatically resume the meeting in response ready to resume messages received by the meeting server 110 and one or more break rules for resuming a meeting, the set duration and/or end time of the meeting break may be overridden so that the meeting resumes when conditions (e.g., users indicating that they are ready to resume the meeting) match the one or more break rules regardless of the set duration and/or end time.

In some embodiments, the meeting may also be manually resumed by the presenter, for example, by selecting the "Meeting Resumed" button 432 of the presenter meeting session screen 550 when the meeting application 200 is in the break mode.

FIG. 5A shows a diagrammatic view of a presenter meeting session user interface screen 500 of the meeting application 200 for a meeting presenter in accordance with one example embodiment of the present disclosure. FIG. 5A shows a meeting view (or mode) of the presenter meeting session screen. The presenter meeting session screen 500 is used by the presenter on the presenter device to control the meeting content provided to meeting participants (e.g., streamed video or presentation) in a content panel or window 510 and a control panel 520. The presenter meeting session screen 500 includes an Options button 422 and Attendee List button 424 described above in connection with the participant meeting session screen 400. The presenter meeting session screen 500 also includes a Questions panel 544 in which Questions submitted to the meeting presenter are displayed, typically in associated with a name of the meeting participant/attendee. The presenter meeting session screen 500 also includes a Meeting ID field 446 that includes the meeting ID.

As noted above, the presenter meeting session screen 500 includes a participant engagement panel 530 which includes a number of statistics based on break request messages and user activity data received by the meeting server 110 from meeting participants, as well as derived information. In the shown embodiment, the participant engagement panel 530 includes an indicator 532 representing a number of participants that would like a break now (immediately) based on selecting the "Break Now" button 464 in the participant meeting session screen 400 (15% in the shown example). The participant engagement panel 530 also includes an indicator 534 representing a number of participants that would like a break after next topic based on selecting the "Break After Next Topic" button 466 in the participant meeting session screen 400 (35% in the shown example). Information relating to the other time parameter options may also be provided in other embodiments.

In the shown embodiment, the participant engagement panel 530 also includes derived information in the form of a meeting freshness indicator 538. The meeting freshness indicator 538 represents the extent to which a meeting break is desirable. When time parameter options are provided when submitting a break request, the meeting freshness is derived from break request messages received for all time parameter options (e.g., now, after the next topic, etc.). In the shown embodiment, the meeting freshness indicator 538 is the sum of the indicators 532 and 534 (50% in the shown example). In other embodiments, the meeting freshness indicator 538 may be a weighted average of the indicators 532 and 534, any other time parameter options, and possibly other factors. A higher weighting may be given to request to have a break sooner. In other embodiments, the meeting freshness indicator 538 may be determined in other ways.

Figure 6:
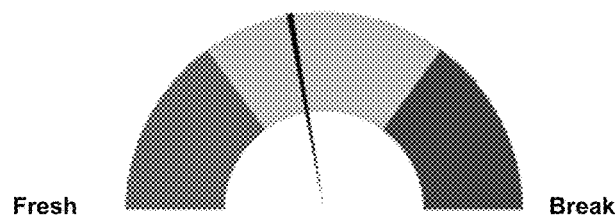
FIG. 6 is a diagrammatic view of an example dial meter user interface element of the meeting application user interface for a meeting presenter of FIGS. 5A and 5B.

In the shown embodiment, the indicators 532, 534, 538 are represented as percentages but may be the raw numbers in other embodiments. In yet other embodiments, the indicators may be provided by a dial meter user interface, an example of which is shown in FIG. 6. For indicators 532, 534 and 538, the range of the dial meter may be from 0% to 100% (low to high) when percentages are used, or 0 and the total number of participants when raw numbers are used (low to high). For indicator 538, the range of the dial meter may be from "fresh" to "break" (low to high) proportional to either the percentages or raw numbers with a needle representing in real-time the current meeting freshness, as shown in the example of FIG. 6.

The participant engagement panel 530 may also include an active meeting session indicator 536 representing the meeting session on participant devices which are "active". This may be determined, for example, based on an amount of time meeting participants are spending in the meeting application 200. The meeting session may be determined to be "active" by the meeting application 200 in a number of ways. For example, when the user is spending more than a threshold amount of time (e.g., 50%) outside of the meeting application 200, the meeting session may be determined to be "inactive" whereas when the user is spending less than the threshold amount of time (e.g., 50%) outside of the meeting application 200, the meeting session may be determined to be "active". Alternatively, when device activity (e.g., received input, data sent and/or received, or combinations thereof) is occurring more than a threshold amount outside of the meeting application 200, the meeting session may be determined to be "inactive" whereas when device activity is occurring less than the threshold amount outside of the meeting application 200, the meeting session may be determined to be "active".

Each participant device, based on the instructions of the meeting application 200, may notify the meeting server 110 by sending a corresponding message when the meeting session is determined to be "active" or "inactive". In some embodiments, the message may be sent whenever the determined status changes, e.g. from "active" or "inactive" or vice versa. In the shown embodiment, the active meeting session indicator 536 is represented by a percentage but may be the raw number in other embodiments. In some embodiments, the active meeting session indicator 536 may be included in the determination of the meeting freshness indicator 538 described above.

As noted above, the meeting application 200 may automatically trigger a break when a break threshold of one or more of the indicators 532, 534, 536, 538 is determined to have been met or exceeded. Triggering a break causes a break message to be sent from the meeting server 110 to participant devices. The break message, when received by the meeting application 200 of participant devices, causes a break message to be displayed on participant devices such as the break notification 480 of FIG. 4C, and may cause the presenter meeting session screen 500 to change from the meeting view to the break view.

Automatic break thresholds may be defined for each of the indicators 532, 534, 536, 538, which may be the same or different depending in the embodiment. For example, a lower threshold may be set for the break now indicator 532 rather than the break after the next topic indicator 534. The automatic break thresholds may be set by the presenter or may be controlled by an information technology (IT) administrator when the meeting application 200 is implemented on an enterprise network, for example, via an IT policy message pushed out to enterprise devices. Default values may be defined for the automatic break thresholds.

The presenter meeting session screen 500 also includes a "Break" button 526, which allows the meeting presenter to trigger a break manually based on user input by selecting the "Break" button 526 using designated input. As noted above, triggering a break causes a break message to be sent from the meeting server 110 to participant devices. The break message, when received by the meeting application 200 of participant devices, causes a break message to be displayed on participant devices such as the break notification 480 of FIG. 4C, and may cause the presenter meeting session screen 500 to change from the meeting view to the break view.

It will be appreciated that the values of the number of statistics in the participant engagement panel 530 are reset when the meeting view of the presenter meeting session user interface screen 500 is again displayed when the meeting resumes after the break. This allows the participant engagement panel 530 to be used to again to determine when to schedule the next meeting break if the meeting is sufficiently long.

FIG. 5B shows a diagrammatic view of a presenter meeting session user interface screen 550 of the meeting application 200 for a meeting presenter in accordance with one example embodiment of the present disclosure. FIG. 5B shows a break view of the presenter meeting session screen during a meeting break. As noted above, the break view of the presenter meeting session screen 550 includes a break status panel 570. In the shown embodiment, the break status panel 570 includes a time remaining indicator 572 representing a time remaining in the break. The time remaining indicator 572 is provided in embodiments in which the meeting break has a set duration. The value of the time remaining indicator 572 may be defined by a countdown timer that is initiated when a break is triggered, either manually by the meeting presenter using the "Break" button 526 or automatically based on received break requests and one or more break rules for triggering a meeting break, as described above. The countdown timer may have a duration based on a default value, set by the meeting presenter, or set by the meeting server 110 based on time parameter values of one or more of the received break request messages.

The break status panel 570 also includes the ready to resume indicator 574 representing a number of participants that are ready to resume the meeting. The value of the ready to resume ready indicator 574 is based on a number of meeting participants that selected the "Ready to Resume" button 482 or 492 in either the break notification 480 or ready to resume notification 490 displayed on the participant devices. The meeting server 110 intercepts all device messages and eliminates duplicate responses should a user select both the "Ready to Resume" buttons 482, 492.

The break status panel 570 also includes the active meeting session indicator 536 described above.

Figure 4E:
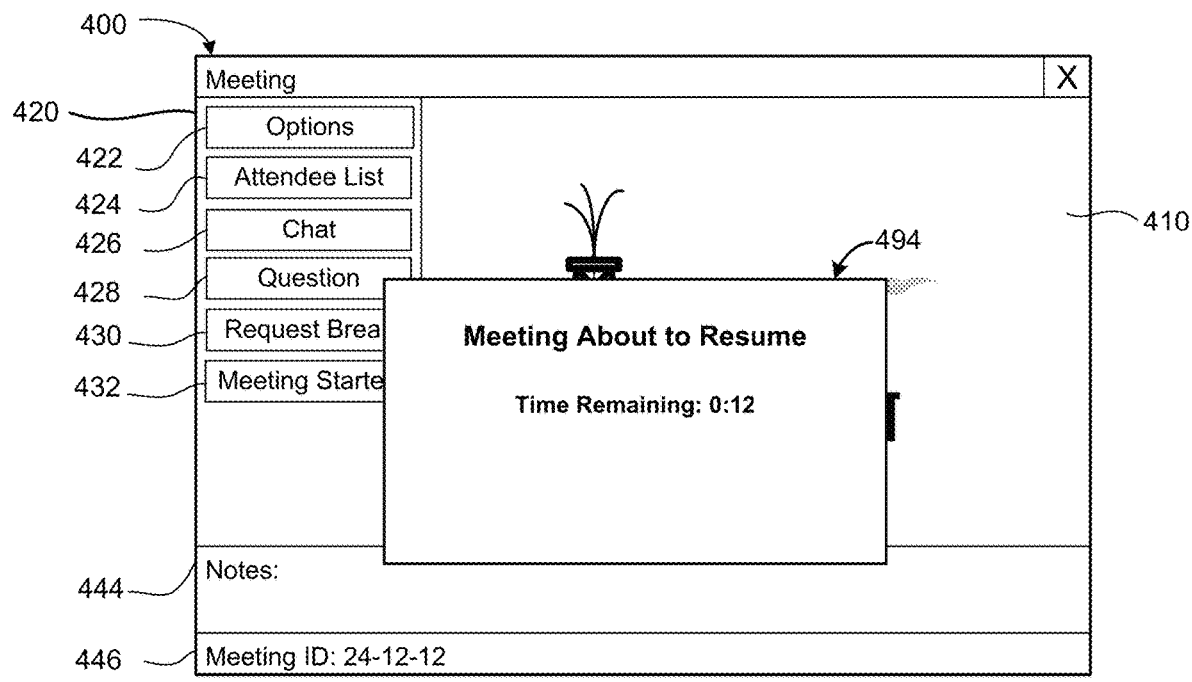

The presenter meeting session screen 550 also includes a "Meeting About to Resume" button 562. When the meeting is about to resume, the meeting presenter may select the "Meeting About to Resume" button 562 using designated input which causes a message to be sent from the meeting server 110 to participant devices. The message, when received by the meeting application 200 of participant devices, causes a "Meeting About to Resume" notification 494 to be displayed on participant devices, for example, as an overlay window that at least partially overlays the participant meeting session screen 400, an example of which is shown in FIG. 4E. The "Meeting About to Resume" notification 494 notifies meeting participants that the meeting is about to resume, and that they should return to the participant meeting session screen 400 if using another application on their device 102, 104. If the meeting is an in-person meeting occurring at least partially in a meeting room, it notifies attendees to return to the meeting room if they have left the meeting room.

The presenter meeting session user interface screen 550 also includes a "Meeting Resumed" button 432 that allows the meeting presenter to notify meeting participants that the meeting has resumed when the meeting application 200 is in the break mode. As noted above, in some embodiments, the meeting may also be manually resumed by the presenter, for example, by selecting the "Meeting Resumed" button 432 of the presenter meeting session screen 550 when the meeting application 200 is in the break mode.

Figure 4F:
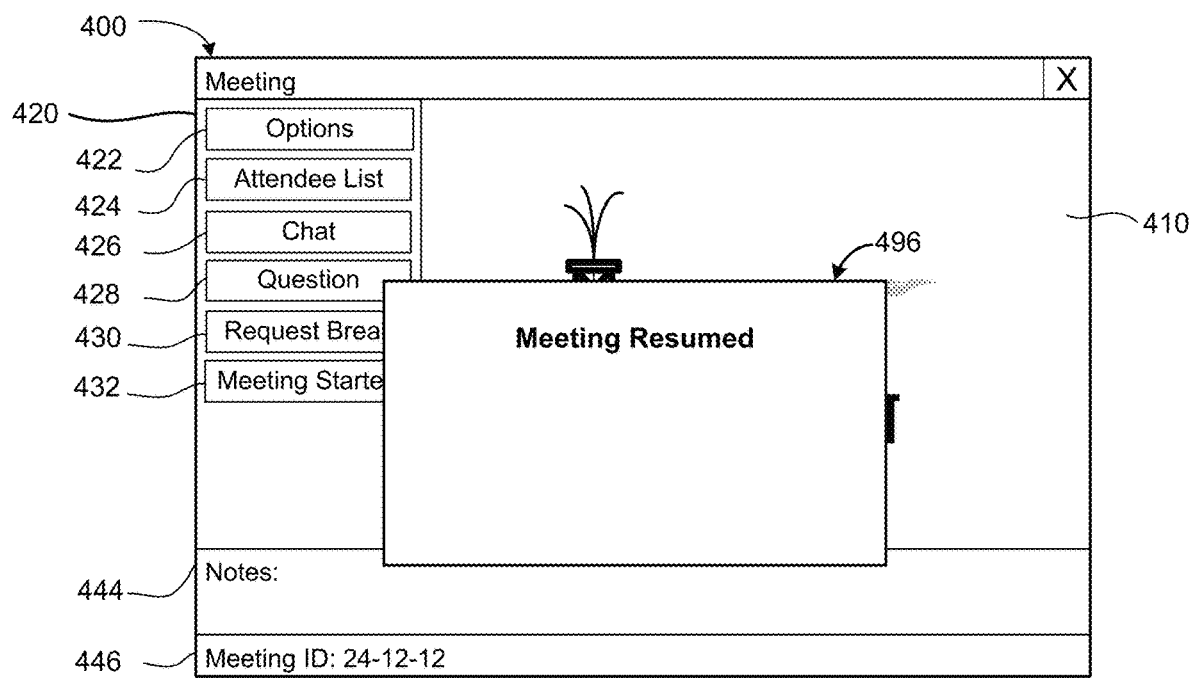

When the meeting presenter selects the "Meeting Resumed" button 432 using designated input, the presenter device sends a message to the meeting server 110 that in turn sends a message to participant devices. The message, when received by the meeting application 200 of participant devices, causes a "Meeting resumed" notification 496 to be displayed on participant devices, for example, as an overlay window that at least partially overlays the participant meeting session screen 400, an example of which is shown in FIG. 4F. The "Meeting resumed" notification 496 notifies meeting participants that the meeting has resumed, and that they should return to the participant meeting session screen 400 if using another application. If the meeting is a physical meeting, it notifies attendees to return to the meeting room if they have left the meeting room.

While the "Meeting About to Resume" notification 494 of FIG. 4E and the "Meeting resumed" notification 496 of FIG. 4F are described as being displayed in response to the selection of a corresponding button by the meeting presenter in the presenter meeting session user interface screen 550, in other embodiments, when the meeting has set duration, one or more of the notifications 494, 496 may be displayed automatically by the meeting application in response to the value of a countdown timer initiated at the start of the meeting break. For example, the "Meeting About to Resume" notification 494 may be automatically displayed a threshold duration before the break is set to end, i.e. a threshold duration before the countdown timer expires. The "Meeting resumed" notification 496 may be automatically displayed when the break ends, i.e. when the countdown timer expires. The countdown timer may have a duration based on a default value, set by the meeting presenter, or set by the meeting server 110 based on time parameter values of one or more of the received break request messages.

The participant meeting session screen 400 may include a "Meeting Resumed" button 432. When the meeting has resumed and the other meeting presenter has forgotten to notify meeting participants, any of the meeting participants may select the "Meeting resumed" button 432 using designated input which causes a message to be sent to the meeting server 110 that in turn sends a message to participant devices.

The presenter meeting session screen 550 may also include a "Ready to Resume?" button 564. The meeting presenter may select the "Ready to Resume?" button 564 using designated input which causes a message to be sent to participant devices. The message, when received by the meeting application 200 of participant devices, causes the "Ready to Resume" notification 490 of FIG. 4D to be displayed on participant devices, which includes the "Ready to Resume" button 492. The "Ready to Resume" button 492" in some ways provides the reverse function of the "Request Break" button 430.

When the "Ready to Resume" button 482 or 492 is selected using designated input, the meeting application 200 sends a message to the meeting server 110. The meeting server 110 aggregates and/or anonymizes responses received, and sends the aggregated and/or anonymized information to the presenter device for display in the presenter meeting session screen 550 in the form of the ready to resume ready indicator 574 of the break status panel 570. In the shown embodiment, the ready to resume indicator 574 is represented as a percentage but may be the raw number in other embodiments.

The time remaining indicator 572 and ready to resume ready indicator 574 provide means for the meeting presenter to determine when the meeting break should end in embodiments in which the meeting break does not have a set duration or end time and the meeting presenter does not want to resume the meeting if a sufficient number of meeting participants are not ready to resume (e.g., for example, a sufficient number attendees have not returned to the meeting room or have not returned to the meeting application 200 on their devices 102, 104). This is particularly advantageous in circumstances the meeting presenter may not see all of the attendees, for example, when the meeting is an in-person meeting in a large room or when the meeting is at least partially virtual in that some of the attendees are attending remotely. Once a threshold amount of attendees has responded by selecting the "Ready to Resume" button 492 using designated input, the meeting presenter may resume the meeting.

It will be appreciated that the values of the number of statistics in the break status panel 570 are reset when the break view of the presenter meeting session user interface screen 550 is again displayed when another break is triggered. This allows the break status panel 570 to be used to again to determine when to schedule the end next meeting break.

Figure 5D:
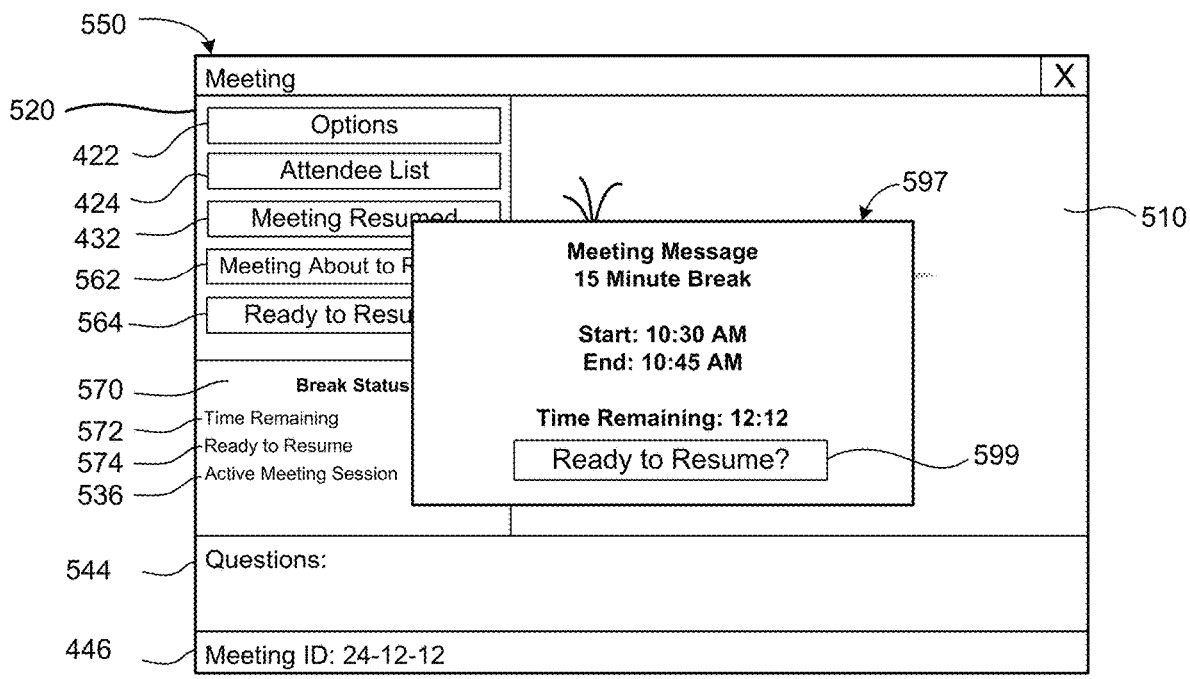

Reference is next made to FIG. 5D, which illustrates an example embodiment of a break notification 597 displayed in the break mode of the presenter meeting session screen 550 when a meeting break occurs. The break notification 597 is similar to the break notification 480 of the participant meeting session screen 400, and includes a "Ready to Resume?" button 599. The "Ready to Resume" button 599 provides the same function as the "Ready to Resume?" button 564 but is more conventionally located. In other embodiments, the "Ready to Resume?" button 599 may be omitted.

In some embodiments, all break-related data sent to the meeting server 110, for example break request messages sent when the "Request Break" button 430 is selected using designated input, and user activity information, including the active meeting session information about the time or activity spent outside of the meeting application 200, is sent partially or totally anonymously. To anonymize the data, break-related data using in scheduling breaks is separated from identifying information about the user and is stored separately from identifying information associated the user. The break-related data is discarded after the meeting session ends.

Figure 3:
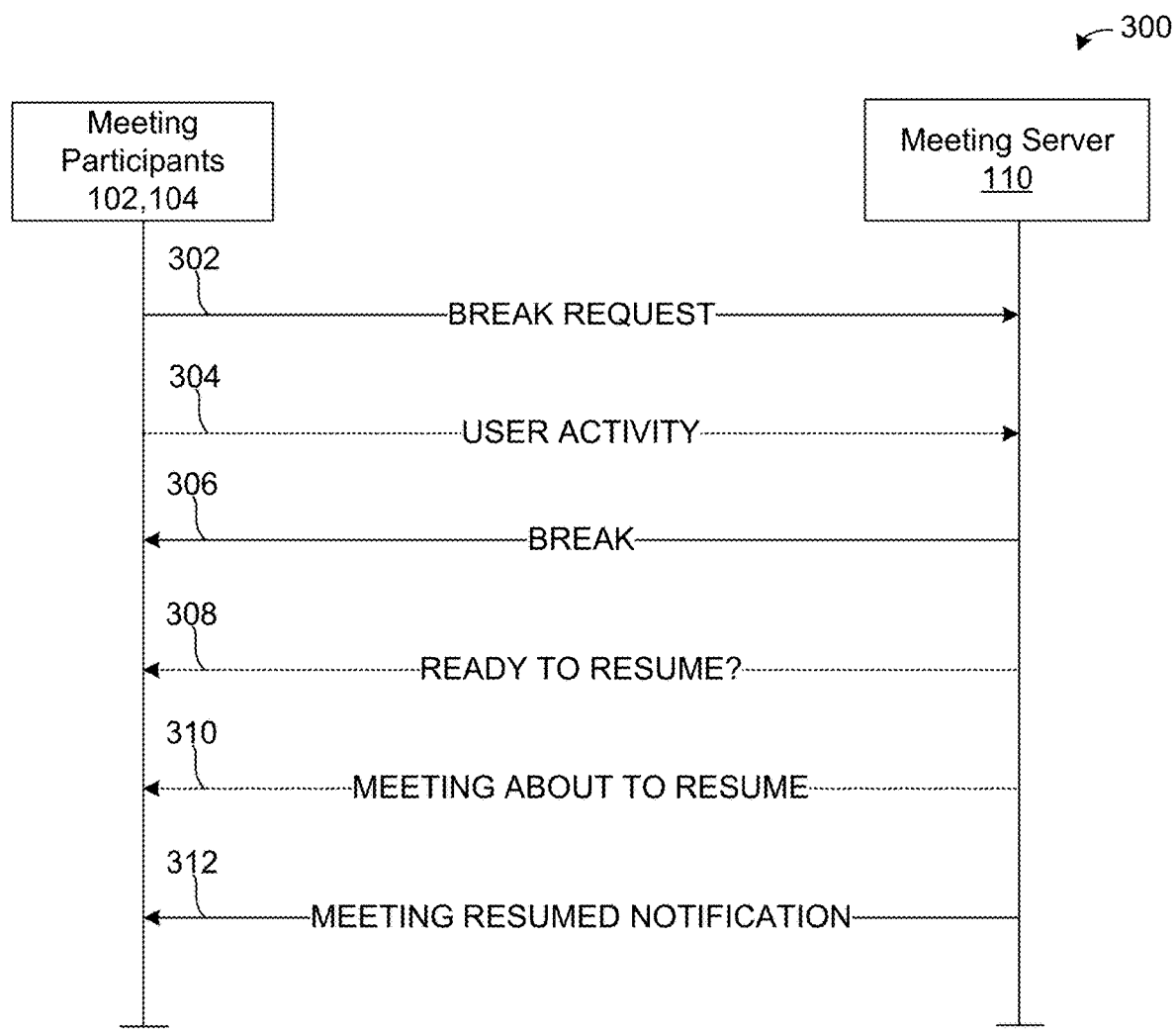
FIG. 3 is a flow diagram of messages exchanged between one or more participant devices and a meeting server in accordance with a method for managing a meeting session in accordance with an example embodiment of the present disclosure.

FIG. 3 illustrates a flowchart of a method 300 of managing a meeting session in accordance with an example embodiment of the present disclosure. As a preliminary step (not shown), a presenter and one or more participants login to the meeting application from respective device, such as smartphones. In other examples, the devices may include a different selection of devices from those described in FIG. 1.

At operation 302, at a time after the meeting session has started, one or more participant devices send break request messages to the meeting server 110 in response to user interaction with the participant meeting session screen 400, as described above. For example, one or more participants selects the "Request Break" button 430 from the participant meeting session screen 400 displayed on their devices 102, 104 using designated input. This causes the meeting application 200 to send a break request message to the meeting server 110 for each participant that selects the "Request Break" button 430 using designated input. The break request messages are received by the meeting server 110 from the devices 102, 104 of the one or more participants that selected the "Request Break" button 430. The meeting server 110 aggregates and/or anonymizes the break request responses.

At optional operation 304, activity information from one or more participant devices indicating whether the meeting session is active or inactive is sent to the meeting server. The activity information is received by the meeting server 110. The meeting server 110 aggregates and/or anonymizes the activity information.

At operation 306, a break message is sent from the meeting server 110 to the participant devices. The break message is received by the participant devices. The meeting application 200, in response to receiving the break message, causes the break notification 480 to be displayed on the display of the participant devices. In some embodiments, the break message is sent automatically when a threshold number of break request messages are received by the server. In other embodiments, the break message is sent automatically when the meeting session is inactive on a threshold number of participant devices.

In some embodiments, the break request message includes a time parameter providing an indicator of a desired time of the break. In some embodiments, the time parameter includes one of an indicator to break immediately, an indicator to break at the next topic, an indicator to break at a specific time, or an indicator to break within a specified duration of time. In some embodiments, the break message is sent automatically when time parameter values of the received break request messages match one or more break rules for initiating a break. In some embodiments, the break message is sent automatically when a threshold number of break request messages are received by the server and time parameter values of the received break request messages match one or more break rules for initiating a break.

In some embodiments, in response to sending the break request at 396, the meeting server 110 sets a duration of the break based on time parameter values of one or more of the received break request messages, initiates a countdown timer with a duration selected based on time parameter values of one or more of the received break request messages, and/or sets a start time of the break based on time parameter values of one or more of the received break request messages.

At optional operation 308, a ready to resume message is sent by the meeting server 110 in response to receiving a corresponding message from the presenter device, which sent the corresponding message in response to user interaction with the participant meeting session screen 400, as described above (e.g., selecting the "Ready to Resume?" button 564 or 596. The ready to resume message is received by the participant devices. The meeting application 200, in response to receiving the ready to resume message, causes the ready to resume notification 490 to be displayed on the display of the participant devices.

At optional operation 310, a meeting about to resume message is sent by the meeting server 110 in response to receiving a corresponding message from the presenter device. The corresponding message may be sent by the meeting resumed message automatically based a countdown timer or in response to user interaction with the participant meeting session screen 400, as described above (e.g., selecting the "Meeting About to Resume" button 562. The meeting about to resume message is received by the participant devices. The meeting application 200, in response to receiving the meeting about to resume message, causes the meeting about to resume notification 494 to be displayed on the display of the participant devices. In some embodiments, the meeting about to resume message is sent automatically a threshold duration of time before expiration of a countdown timer with a duration set to a duration of the break.

At optional operation 312, a meeting resumed message is sent by the meeting server 110 in response to receiving a corresponding message from the presenter device. The corresponding message may be sent by the meeting resumed message automatically based a countdown timer or in response to user interaction with the participant meeting session screen 400, as described above (e.g., selecting the "Meeting Resumed" button 432. The meeting resumed message is received by the participant devices. The meeting application 200, in response to receiving the meeting resumed message, causes the meeting resumed message notification 496 to be displayed on the display of the participant devices. In some embodiments, the meeting resumed message is sent automatically in response to expiration of a countdown timer with a duration set to a duration of the break The solution provided by the present disclosure allows users to use their mobile device, such as a smartphone or laptop, or a locally connected computer, to view meeting content (e.g., streamed video or presentation), take notes and contribute content to the meeting, whether or not audio is being used for the meeting content. The meeting application 200, as part of the user interface, includes features which facilitate the scheduling and management of meeting breaks. These features, including messaging features, allow the efficient receiving and gathering of input from participants to schedule breaks at more optimal times, with less overall downtime and with more optimal start times and stop times. This reduces lost productivity and increases participant engagement.

For example, users may be in a large meeting that lasts several hours or possibly an entire day. Conventionally, one or more of the following situations occurs. In a first use case, the meeting presenter is very engaged in the topic being presented and does not want to stop for a break at an appropriate time, with the result that one or more attendees want a break but do not request one and are losing attention. As a consequence, the attendees are not able to take full advantage of the topics presented. In another use case, the meeting presenter stops the presentation for a break when the attendees do not want a break and are fully engaged and attentive. As a consequence, stopping the meeting now for a break reduces the effectiveness of the material absorption. In a further use case, the meeting presenter wastes time asking people if they need a break throughout the day. In yet a further use case, during the break the attendees are told they have n minutes before the start of the next topic. Some attendees lose track of time talking in the hallway or using their smartphones and miss out on the start of the next topic.

Advantageously, with improved meeting session management meeting participants are more engaged providing greater benefits to meeting participants are and better value for companies or other institutions for which the meeting participants are associated which may have spent money to have its employees or associates attending the meeting and along with the lost productivity caused by the employees being otherwise unavailable during the meeting.

In the present disclosure a variety of descriptive and intuitive names and labels have been used for user interface elements such as buttons. These names and labels are not intended to be limiting and other descriptive and intuitive names and labels could be used. For example, rather than referring to the meeting as resuming the names and labels could refer to the meeting as starting in one or more instances, e.g. "Meeting About to Resume" may be replaced with "Meeting About to Start". It is also contemplated that the names and labels could be context sensitive in some embodiments. For example, the meeting application 200 may know when the meeting has yet to begin and when the meeting is on a break, and may change the terms starting or resuming based on this context.

While the above-described embodiments include a meeting presenter, in other embodiments there may be no meeting presenter. The meeting is group discussion. In some embodiments, one of the devices 102, 104 enters as a moderator or as a meeting organizer/owner with similar rights and performing similar functions as the meeting presenter although there is no content to share.

Figure 7A:
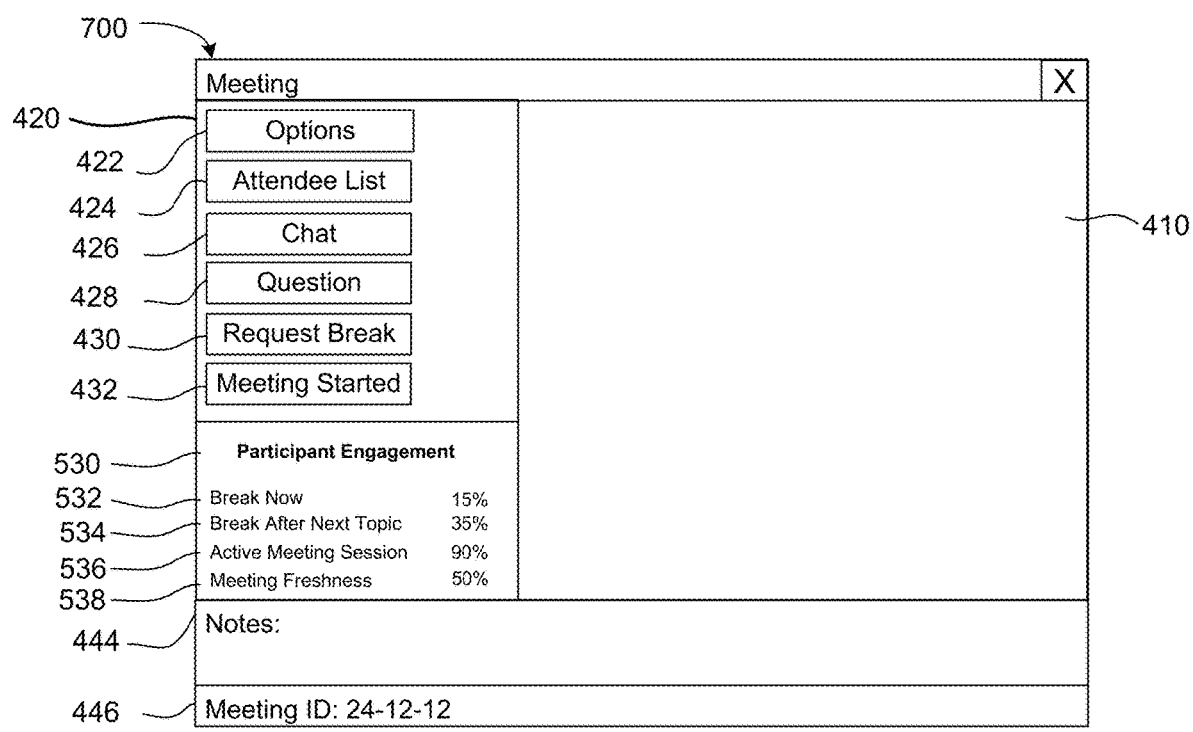
FIGS. 7A to 7C are diagrammatic views of example user interface screens of a meeting application user interface for a meeting participant in accordance with another example embodiment of the present disclosure.

FIG. 7A shows a diagrammatic view of a participant meeting session user interface screen 700 of the meeting application 200 for a meeting participant in a meeting mode in accordance with another example embodiment of the present disclosure in which there is no presenter and there is no content to share. All devices 102, 104 enter the meeting session as meeting participants. The participant meeting session user interface screen 700 is similar to the participant meeting session user interface screen 400. However, the participant meeting session screen 700 includes the participant engagement panel 530 of the presenter meeting session screen 500 when in the meeting mode. This allows break request information to be viewed by all meeting participants. Also, because there is no content to share the content panel 410 is empty in the shown embodiment. In other embodiments, the content panel 410 may be omitted may there is no presenter.

The meeting application 200 may automatically display a break request notification on the display of each participant device in response to the meeting server 110 detecting a predetermined trigger condition. In some embodiments, the trigger condition is receiving by the meeting server 110 a break request from any of the participant devices. In other embodiments, the trigger condition is receiving by the meeting server 110 a threshold number of break requests. The threshold number may be configurable, for example by the presenter or the meeting server 110. In some embodiments, the threshold number is an integer or percentage representing a simple majority based on the number of meeting participants. In some embodiments, the threshold has a default value. In some embodiments, the threshold may be based on a priority of the meeting.

In yet other embodiments, the time parameter options in the break request user interface 460 displayed in response to selecting the "Request Break" button 430 may be considered. As noted above, the time parameter options allow the meeting application 200 to automatically determine whether and/or when to trigger a meeting a break based on the received time parameter values and a set of one or more break rules for trigger a meeting break. In some embodiments, the decision when to break is based on determining whether a threshold number of meeting participants have indicated that they wish to break now, after the current topic is finished, or another time. The threshold may have a default value and may be configurable, for example by the meeting presenter or the meeting server 110. The threshold number may be a simple majority based on the number of meeting participants. The threshold may be based on a priority of the meeting.

In yet other embodiments, the time parameter options are not considered/are ignored.

Figure 7B:
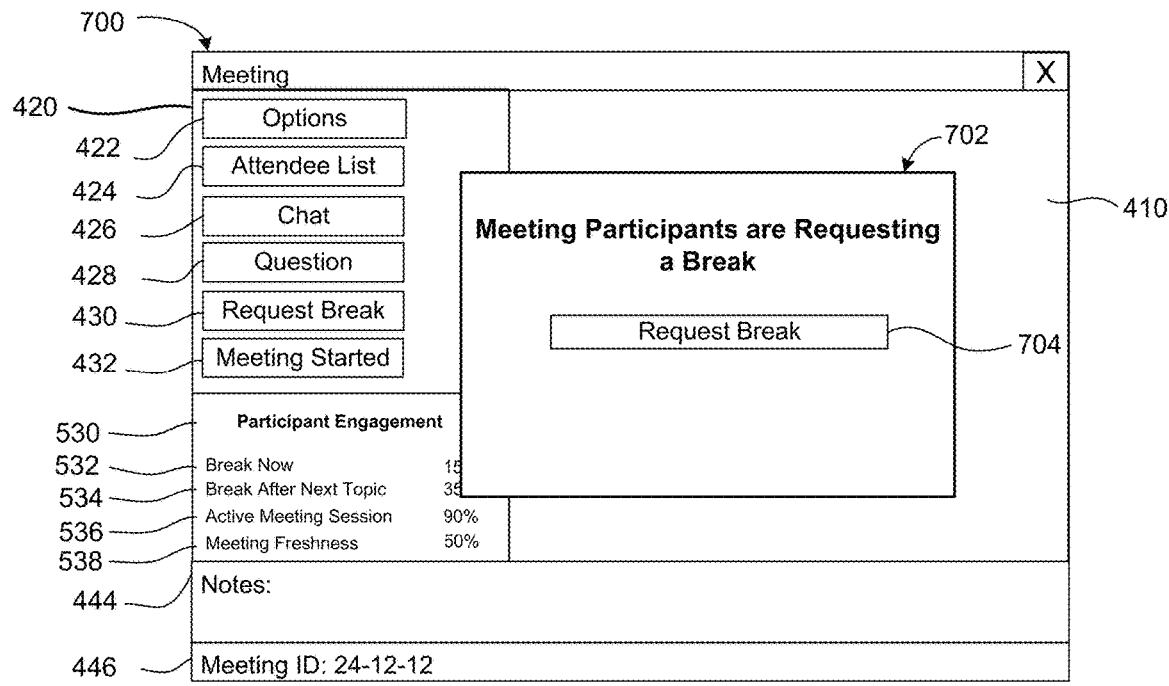

FIG. 7B shows an example of a break request notification 702. The break request notification 702 includes a "Request Break" button 704 that provides the same function as the "Request Break" button 430 but is more conventionally located. In some embodiments, the meeting server 110 automatically triggers a break when a threshold number of break requests are received by the meeting server 110. In embodiments in which the break request notification 702 is displayed in response to the meeting server 110 receiving a threshold number of break requests (the "first threshold"), the threshold number of break requests that automatically triggers a break (the "second threshold") is larger than the triggers the threshold number of break requests that triggers the display of the break request notification 702 (the "first threshold").

Figure 7C:
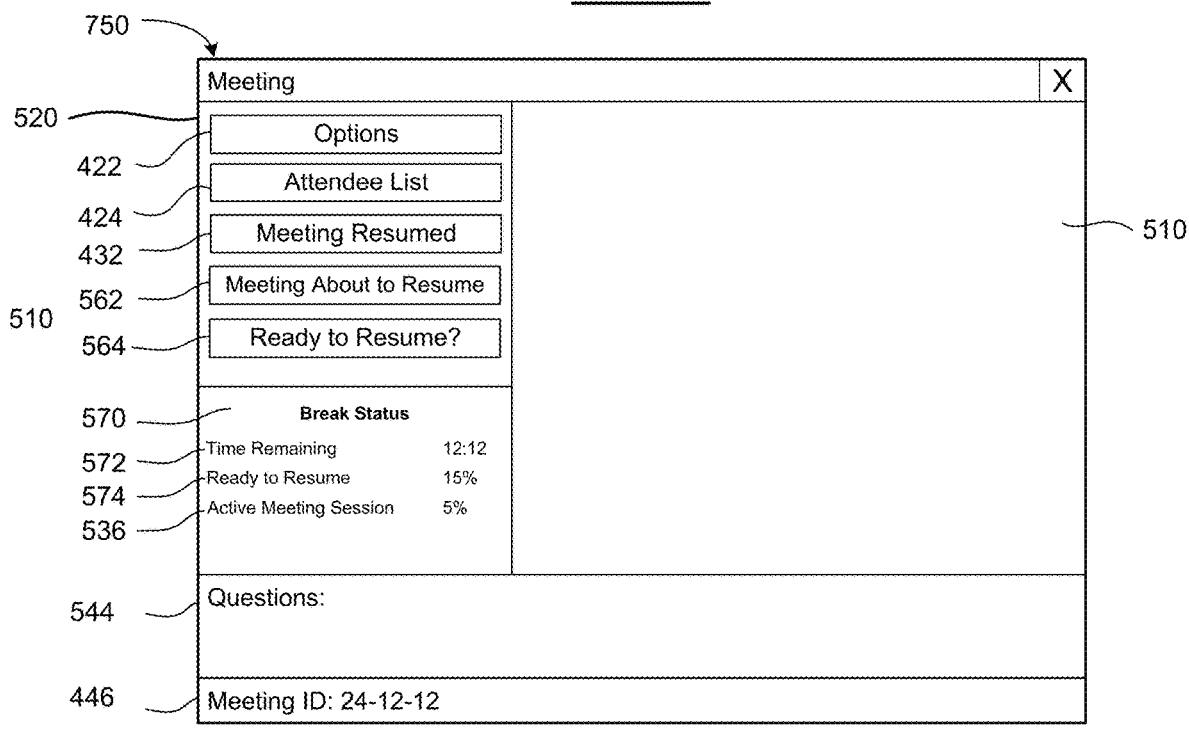

As shown in FIG. 7C, a participant meeting session user interface screen 750 in a break mode may be displayed when a break is triggered. The participant meeting session operates in a manner similar to the presenter meeting session screen 550 described above. Notably, the participant meeting session screen 750 includes the break status panel 570. This allows all the break status information to be viewed by all meeting participants.

In the present disclosure a number of numerical values are described, mostly in terms of percentages. This is not intended to be limiting. Most numerical values described in the present disclosure may be expressed as either an integer, decimal or percentage.

The selecting of onscreen buttons described may be performed using designated input that may vary between embodiments depending on the input devices of the device 102, 104. For example, when a touchscreen is used as the input device, the designated input may be touching the onscreen buttons. For another example, when a navigation tool such as a mouse or other pointing device is used as the input device, the designated input may be clicking a designated button.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as a memory of the mobile device 102.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. For example, the methods may be implemented in software stored in a pre-recorded storage device or other similar machine readable medium having executable program instructions stored thereon for performing the methods described herein, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods may be implemented in hardware components or combinations of hardware and software such as, for example, ASICs, special purpose computers, or general purpose computers.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of managing an online meeting session between one or more participant devices and a presenter device, the method comprising:

displaying a break request user interface on a display of at least one of the one or more participant devices in response to received input, wherein the break request user interface includes a plurality of time parameter options including an indicator of a requested time of a break, the plurality of time parameter options including an indicator to break immediately, an indicator to break at a next topic, an indicator to break at a specific time, and an indicator to break within a specified duration of time;

receiving, by the at least one of the one or more participant devices, a selection of a user interface object that represents one of the time parameter options;

sending a break request message by the at least one of the one or more participant devices to a server over a communication network that manages the online meeting session via a communication subsystem in response to received input, wherein the break request message includes a time parameter value in accordance with the time parameter option represented by the user interface object, and the at least one of the one or more participant devices is located in a physical location that is different than the presenter device;

receiving, by the at least one of the one or more participant devices, over the communications network, a break message from the server, wherein the break message indicates that the server determines to break the online meeting session; and displaying a break notification on the display of the at least one of the one or more participant devices in response to receiving the break message from the server.

2. A user device, comprising:

a display;

at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising:

displaying a break request user interface on the display in response to received input, wherein the break request user interface includes a plurality of time parameter options including an indicator of a requested time of a break, the plurality of time parameter options including an indicator to break immediately, an indicator to break at a next topic, an indicator to break at a specific time, and an indicator to break within a specified duration of time;

receiving a selection of a user interface object that represents one of the time parameter options;

sending a break request message to a server over a communication network that manages an online meeting session including the user device and a presenter device in response to received input, wherein the break request message includes a time parameter value in accordance with the time parameter option represented by the user interface object, and the user device is located in a physical location that is different than the presenter device;

receiving over the communications network, a break message from the server, wherein the break message indicates that the server determines to break the online meeting session; and displaying a break notification on the display in response to receiving the break message from the server.

3. A non-transitory computer-readable medium storing instructions which, when executed, cause a user device to perform operations comprising:

displaying a break request user interface on a display of the user device in response to received input, wherein the break request user interface includes a plurality of time parameter options including an indicator of a requested time of a break, the plurality of time parameter options including an indicator to break immediately, an indicator to break at a next topic, an indicator to break at a specific time, and an indicator to break within a specified duration of time;

receiving a selection of a user interface object that represents one of the time parameter options;

sending a break request message to a server over a communication network that manages an online meeting session including the user device and a presenter device in response to received input, wherein the break request message includes a time parameter value in accordance with the time parameter option represented by the user interface object, and the user device is located in a physical location that is different than the presenter device;

receiving over the communications network, a break message from the server, wherein the break message indicates that the server determines to break the online meeting session; and displaying a break notification on the display in response to receiving the break message from the server.

4. The method of claim 1, wherein the break message is sent by the server in response to the time parameter value matching one or more break rules for initiating the break.

5. The method of claim 1, wherein the break message is sent by the server in response to a threshold number of break request messages being received by the server and time parameter values of the received break request messages matching one or more break rules for initiating the break.

6. The method of claim 1, further comprising:
receiving, from the server, a meeting about to resume message before an end of the break; and
outputting a meeting about to resume notification on the display.

7. The method of claim 1, further comprising:
receiving, from the server, a meeting resumed message; and
outputting, a meeting resumed notification on the display.

8. The method of claim 1, further comprising sending, to the server, activity information indicating whether the online meeting session is active or inactive, wherein the break message is sent by the server in response to the online meeting session being inactive on a threshold number of participant devices.

9. The method of claim 1, wherein the break notification includes one or more of a break duration, a break start time, a break end time, or a time remaining.

10. The method of claim 1, further comprising:
receiving, from the server, a status request message; and
sending, in response to the status request message, a ready to resume message.

11. The user device of claim 2, wherein the break message is sent by the server in response to the time parameter value matching one or more break rules for initiating the break.

12. The user device of claim 2, wherein the break message is sent by the server in response to a threshold number of break request messages being received by the server and time parameter values of the received break request messages matching one or more break rules for initiating the break.

13. The user device of claim 2, the operations further comprising:
receiving, from the server, a meeting about to resume message before an end of the break; and
outputting a meeting about to resume notification on the display.

14. The user device of claim 2, the operations further comprising:
receiving, from the server, a meeting resumed message; and
outputting, a meeting resumed notification on the display.

15. The user device of claim 2, the operations further comprising sending, to the server, activity information indicating whether the online meeting session is active or inactive, wherein the break message is sent by the server in response to the online meeting session being inactive on a threshold number of participant devices.

16. The user device of claim 2, wherein the break notification includes one or more of a break duration, a break start time, a break end time, or a time remaining.

17. The user device of claim 2, the operations further comprising:
receiving, from the server, a status request message; and
sending, in response to the status request message, a ready to resume message.

18. The non-transitory computer-readable medium of claim 3, wherein the break message is sent by the server in response to the time parameter value matching one or more break rules for initiating the break.

19. The non-transitory computer-readable medium of claim 3, wherein the break message is sent by the server in response to a threshold number of break request messages being received by the server and time parameter values of the received break request messages matching one or more break rules for initiating the break.

20. The non-transitory computer-readable medium of claim 3, the operations further comprising:
receiving, from the server, a meeting about to resume message before an end of the break; and
outputting a meeting about to resume notification on the display.

* * * * *